(12) United States Patent
Park et al.

(10) Patent No.: US 10,125,941 B2
(45) Date of Patent: Nov. 13, 2018

(54) LAMP FOR VEHICLE AND METHOD FOR CONTROLLING THE SAME

(71) Applicant: LG ELECTRONICS INC., Seoul (KR)

(72) Inventors: Sangshin Park, Seoul (KR); Taeyoung Na, Seoul (KR)

(73) Assignee: LG Electronics Inc., Seoul (KR)

( * ) Notice: Subject to any disclaimer, the term of this patent is extended or adjusted under 35 U.S.C. 154(b) by 28 days.

(21) Appl. No.: 15/466,115

(22) Filed: Mar. 22, 2017

(65) Prior Publication Data
US 2018/0180247 A1  Jun. 28, 2018

(30) Foreign Application Priority Data

Dec. 27, 2016  (KR) .................. 10-2016-0180424

(51) Int. Cl.
| F21V 7/00 | (2006.01) |
| F21S 41/675 | (2018.01) |
| F21S 8/10 | (2006.01) |
| B60Q 1/06 | (2006.01) |
| F21S 41/20 | (2018.01) |
| F21S 41/657 | (2018.01) |
| F21S 41/36 | (2018.01) |

(52) U.S. Cl.
CPC .............. *F21S 41/675* (2018.01); *B60Q 1/06* (2013.01); *F21S 41/285* (2018.01); *F21S 41/36* (2018.01); *F21S 41/657* (2018.01); *F21S 48/1225* (2013.01); *F21S 48/1388* (2013.01); *F21S 48/1742* (2013.01); *F21S 48/1757* (2013.01); *B60Q 2200/30* (2013.01)

(58) Field of Classification Search
CPC ............ F21S 41/675; F21S 41/36; B60Q 1/06
See application file for complete search history.

(56) References Cited

U.S. PATENT DOCUMENTS

2016/0039330 A1* 2/2016 Rosenhahn .............. B60Q 1/06
                                                                   362/512
2017/0138555 A1* 5/2017 Hirasawa ................. B60Q 1/14

FOREIGN PATENT DOCUMENTS

| JP | 2014002908 A1 | 5/2016 |
| KR | 2012032225 A1 | 4/2012 |
| KR | 2015080768 A1 | 7/2015 |
| KR | 2016104298 A1 | 9/2016 |

* cited by examiner

*Primary Examiner* — Evan Dzierzynski
(74) *Attorney, Agent, or Firm* — Fish & Richardson P.C.

(57) ABSTRACT

A lamp for a vehicle that includes: a light source unit that includes a first light source and a second light source; a reflection unit that includes a reflector configured to reflect light incident from one of the first light source or the second light source; a lens including: a first region to which light from the first light source is directed, a second region to which light from the second light source is directed, and a third region (i) that is different from the first region and the second region and (ii) to which light reflected by the reflector is directed; and a processor that is configured to control at least one of the first light source or the second light source to change a size or a center position of at least one of the first region, the second region, or the third region is disclosed.

23 Claims, 27 Drawing Sheets

FIG. 1
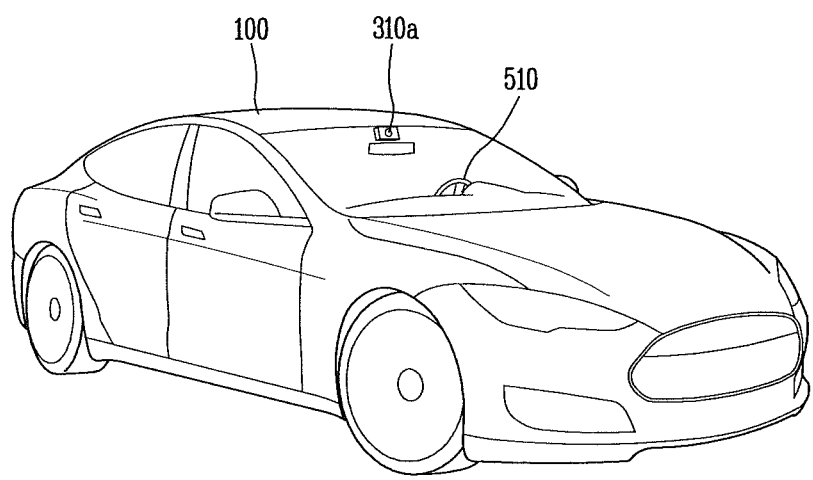
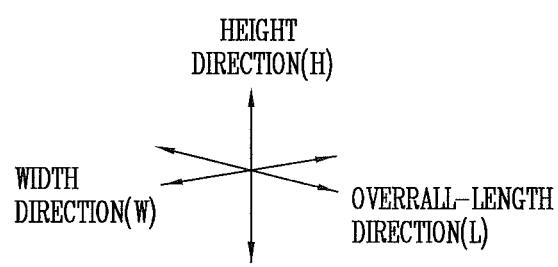

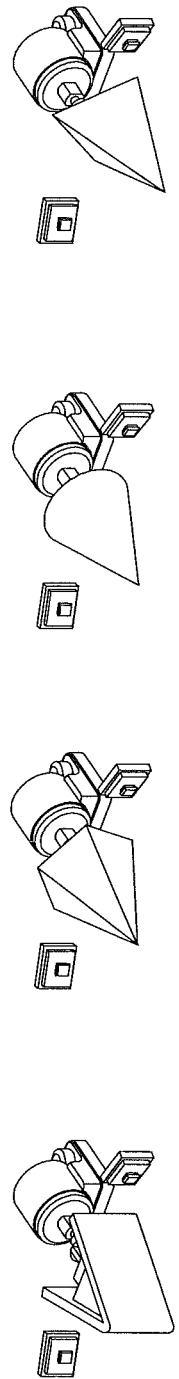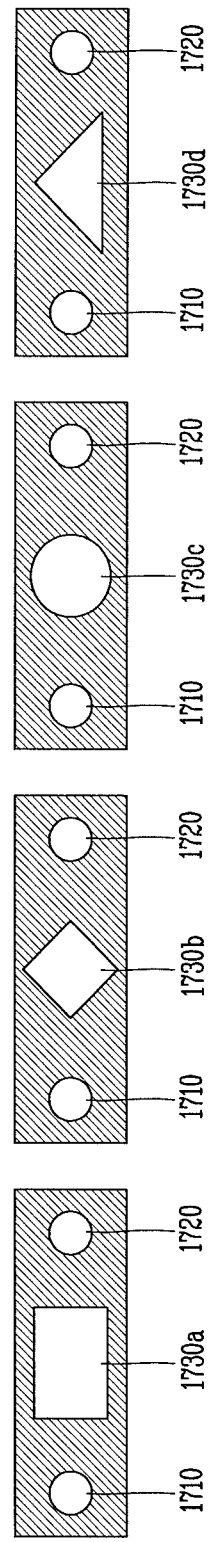

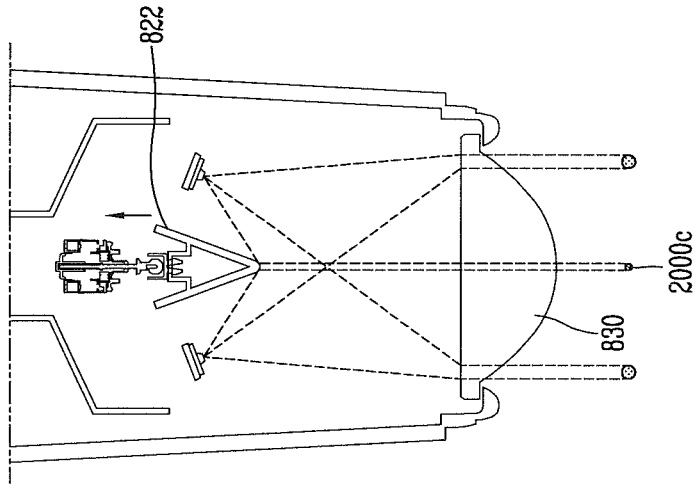
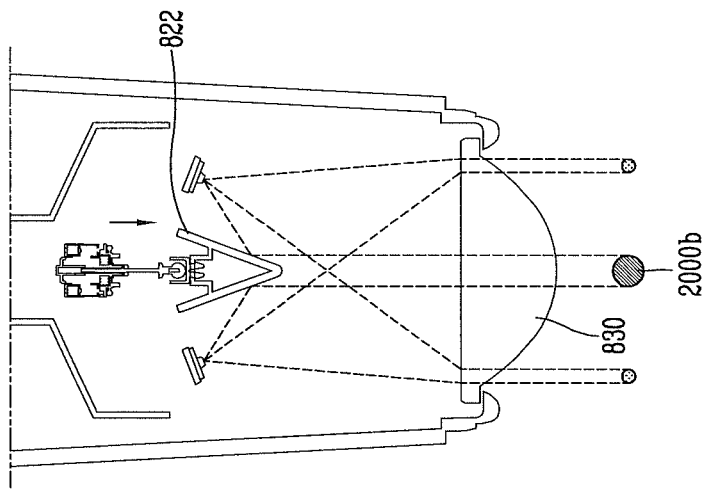
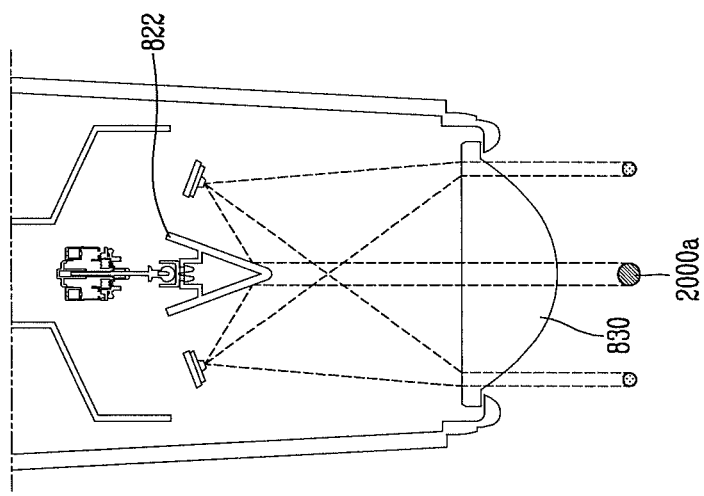

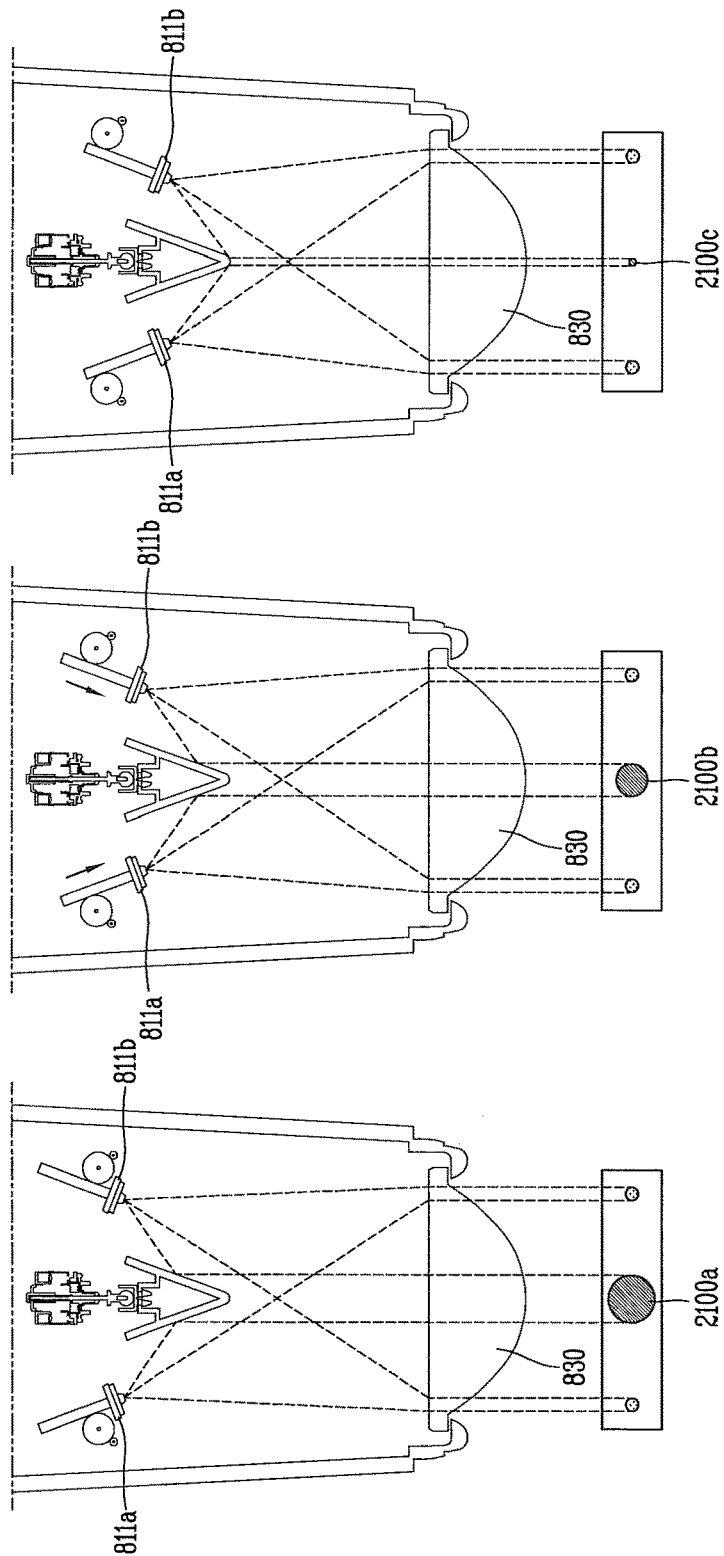

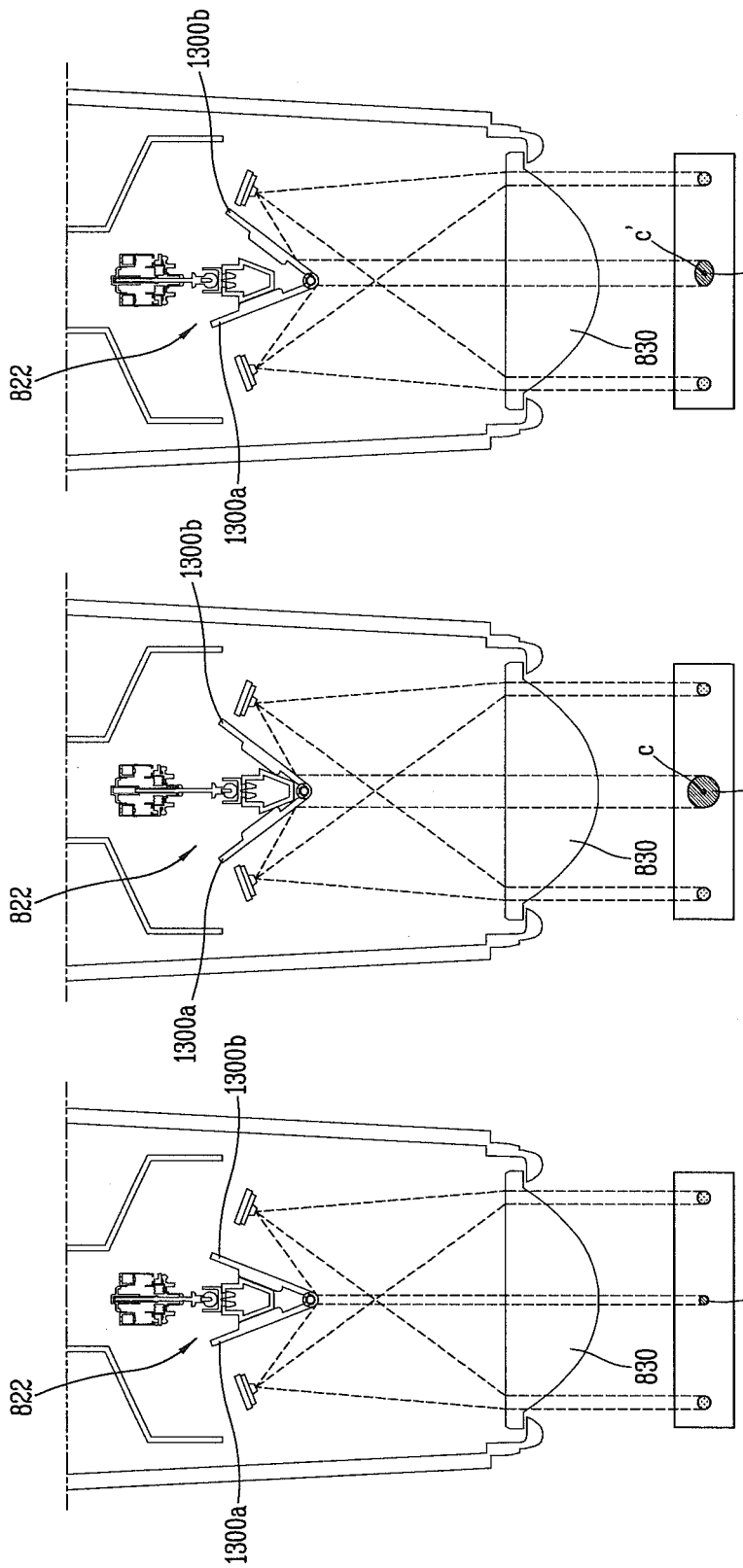

12,541 B2

LAMP FOR VEHICLE AND METHOD FOR CONTROLLING THE SAME

CROSS-REFERENCE TO RELATED APPLICATION

Pursuant to 35 U.S.C. § 119(a), this application claims the benefit of an earlier filing date of and the right of priority to Korean Application No. 10-2016-0180424, filed on Dec. 27, 2016, the content of which is incorporated by reference herein in its entirety.

TECHNICAL FIELD

The present application generally relates to technologies related to a lamp for a vehicle.

BACKGROUND

A vehicle is an apparatus which can be driven by a user who gets therein in a desired direction, and a representative example may be a car.

For convenience of a user using a vehicle, various sensors and electronic devices are equipped in the vehicle. Specifically, a study on an Advanced Driver Assistance System (ADAS) is actively undergoing. In addition, an autonomous vehicle is actively under development.

A vehicle may be provided with various types of lamps. In general, the vehicle includes various vehicle lamps having a lighting function of facilitating articles or objects near the vehicle to be recognized during driving at night, and a signaling function of notifying a driving state of the vehicle to other vehicles or pedestrians.

For example, the vehicle may include devices operating in a manner of directly emitting light using lamps, such as a head lamp emitting light to a front side to ensure a driver's view, a brake lamp turned on when slamming the brake on, turn indicator lamps used upon a left turn or a right turn.

As another example, reflectors for reflecting light to facilitate the vehicle to be recognized from outside are mounted on front and rear sides of the vehicle.

Installation criteria and standards of the lamps for the vehicle are regulated as rules to fully exhibit each function.

In some implementations, as the development of the advanced driving assist system (ADAS) is actively undergoing in recent time, development of a technology for optimizing user's convenience and safety while driving a vehicle is required.

As one effort, development of lamps for a vehicle, which are capable of outputting light in various manners by reflecting the ADAS is actively undergoing.

SUMMARY

In general, one innovative aspect of the subject matter described in this specification can be implemented in a lamp for a vehicle comprising: a light source unit that is configured to generate light and that includes a first light source and a second light source; a reflection unit that is located between the first light source and the second light source and that includes a reflector configured to reflect light that is incident from at least one of the first light source or the second light source; a lens including: a first region to which light from the first light source is directed, a second region to which light from the second light source is directed, and a third region (i) that is different from the first region and the second region and (ii) to which light reflected by the reflector is directed; and a processor that is configured to control at least one of the first light source or the second light source to change a size or a center position of at least one of the first region, the second region, or the third region.

The foregoing and other implementations can each optionally include one or more of the following features, alone or in combination. In particular, one implementation includes all the following features in combination. The reflection unit further includes: an actuator that is configured to move the reflector, and a pivot coupling portion that couples the actuator to the reflector. The actuator is configured to: move the reflector linearly along a first axis that extends from the actuator to the reflector. The reflection unit further includes: a ball joint that couples the pivot coupling portion to the reflector and that is configured to enable rotation of the reflector. The reflector includes: a plurality of reflective surfaces that are configured to reflect light that is incident from at least one of the first light source or the second light source, and wherein the plurality of reflective surfaces are joined at a first portion of the reflector. Each of the plurality of reflective surfaces is configured to rotate independently, and wherein a first end of each reflective surface is rotatably fixed to the first portion of the reflector. The plurality of reflective surfaces include: a first reflective surface and a second reflective surface, wherein the first reflective surface and the second reflective surface are joined at the first portion of the reflector, and wherein each of the first reflective surface and the second reflective surface is configured to rotate about a third axis that is adjacent to the first portion of the reflector. The plurality of reflective surfaces includes: at least three reflective surfaces, wherein the at least three reflective surfaces are joined at the first portion of the reflector, and wherein each of the at least three reflective surfaces is configured to move and establish a first angle between the reflective surface and the pivot coupling portion. The pivot coupling portion includes: a first coupling portion that is coupled to the actuator, a second coupling portion that surrounds at least a portion of an outer surface of the first coupling portion, and a third coupling portion that couples the second coupling portion to the plurality of reflective surfaces, wherein, based on movement of the actuator, each of the plurality of reflective surfaces is configured to move and establish a first angle between the reflective surface and the pivot coupling portion. The light source unit includes: a linear gear that is coupled to the first light source or the second light source, and a first driving portion that is coupled to the linear gear and that is configured to move the linear gear linearly. The first driving portion includes: a rotatable gear that is coupled to the linear gear, and a first actuator that is coupled to the rotatable gear and that is configured to rotate the rotatable gear, and wherein, based on rotation of the rotatable gear, the linear gear is configured to move linearly. The light source unit includes: a linear gear that is coupled to the first light source or the second light source, and a second driving portion that is coupled to the linear gear and that is configured to rotate the linear gear about a fourth axis that is in a plane of the linear gear. The second driving portion includes: a circular plate that is coupled to a portion of the linear gear, and a second actuator that is coupled to the circular plate and that is configured to rotate the circular plate, wherein, based on rotation of the circular plate, the linear gear is configured to rotate about the fourth axis. The processor is configured to: based on rotation or movement of the first light source or the second light source, change a size or a center position of each of the first region and the second region. The processor is configured to: based on (i) rotation or movement of the reflector, (ii) rotation or movement of the first light source or the second light source, or (iii) an inclination of the reflector, change a center position or a size of the third region. The processor is configured to: change a size of the third region based on the reflector moving toward the lens. The processor is configured to: change a size of the third region based on the first light source or the second light source moving toward the lens. The processor is configured to: change a size of the third region based on the first light source or the second light source rotating toward the reflector. The processor is configured to: change a size of the third region based on the reflector being inclined toward the lens. The processor is configured to: move a center position of the third region in a direction to which the reflector rotates. The processor is configured to: move a center position of the third region based on the reflector being inclined toward the lens. The processor is configured to: move a center position of the third region based on the first light source or the second light source moving or rotating.

In general, another innovative aspect of the subject matter described in this specification can be implemented in a vehicle including a lamp that comprises: a light source unit that is configured to generate light and that includes a first light source and a second light source; a reflection unit that is located between the first light source and the second light source and that includes a reflector configured to reflect light that is incident from at least one of the first light source or the second light source; a lens including: a first region to which light from the first light source is directed, a second region to which light from the second light source is directed, and a third region (i) that is different from the first region and the second region and (ii) to which light reflected by the reflector is directed; and a processor that is configured to control at least one of the first light source or the second light source to change a size or a center position of at least one of the first region, the second region, or the third region.

The subject matter described in this specification can be implemented in particular examples so as to realize one or more of the following advantages. Comparing to a conventional lamp for a vehicle, a lamp for a vehicle can output various beam patterns using suitable light sources.

In addition, the lamp can change sizes or positions of direct light and reflected light by rotating or moving a light source or a reflector.

Furthermore, the lamp can output light to a particular object precisely by controlling a size or a position of reflected light.

The details of one or more examples of the subject matter described in this specification are set forth in the accompanying drawings and the description below. Other potential features, aspects, and advantages of the subject matter will become apparent from the description, the drawings, and the claim.

BRIEF DESCRIPTION OF THE DRAWINGS

FIG. 1 is a diagram illustrating an example vehicle.
FIGS. 17 to 27 are diagrams illustrating example operations of a reflector and a light source unit to change beam patterns.

Like reference numbers and designations in the various drawings indicate like elements.

DETAILED DESCRIPTION

A vehicle includes cars, motorcycles and the like. In this specification, a car is described as an example of a vehicle. The vehicle includes an internal combustion engine car having an engine as a power source, a hybrid vehicle having an engine and an electric motor as power sources, an electric vehicle having an electric motor as a power source, and the like.

In this specification, it should be understood that, although various terms such as "left" and "right" are used, these terms indicate relative positioning of components under the assumption that a left side of a vehicle refers to a left side in a driving direction of the vehicle. The terms do not necessarily indicate a specific orientation.

Figure 2:
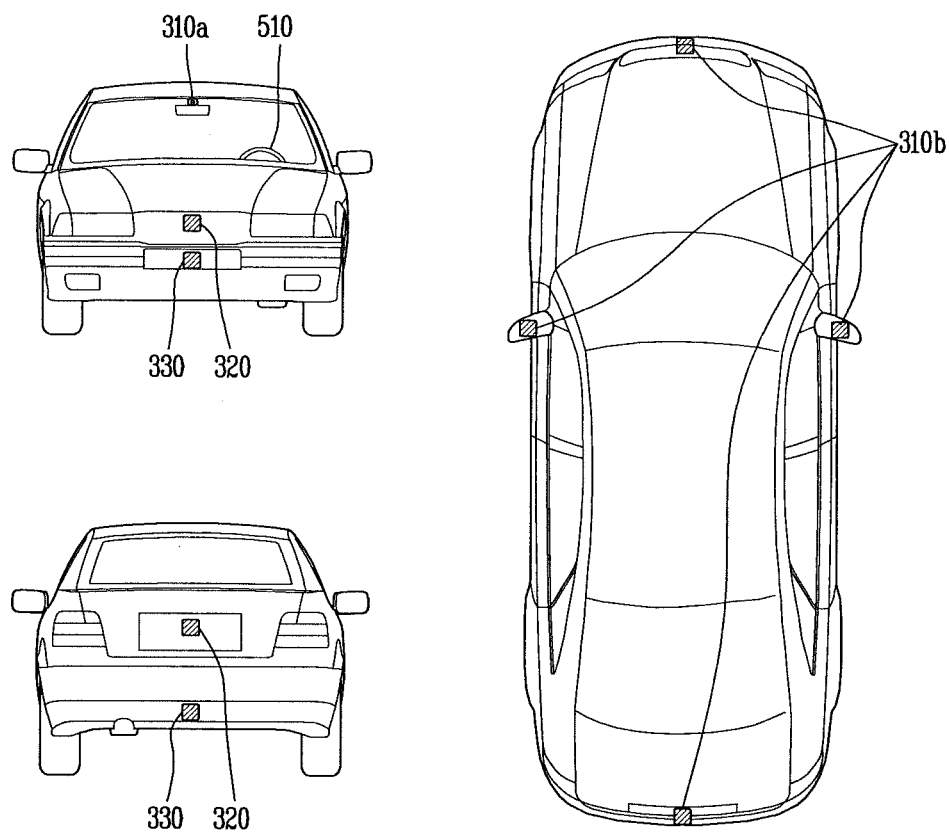
FIG. 2 is a diagram illustrating an example exterior of a vehicle.
Figure 3:
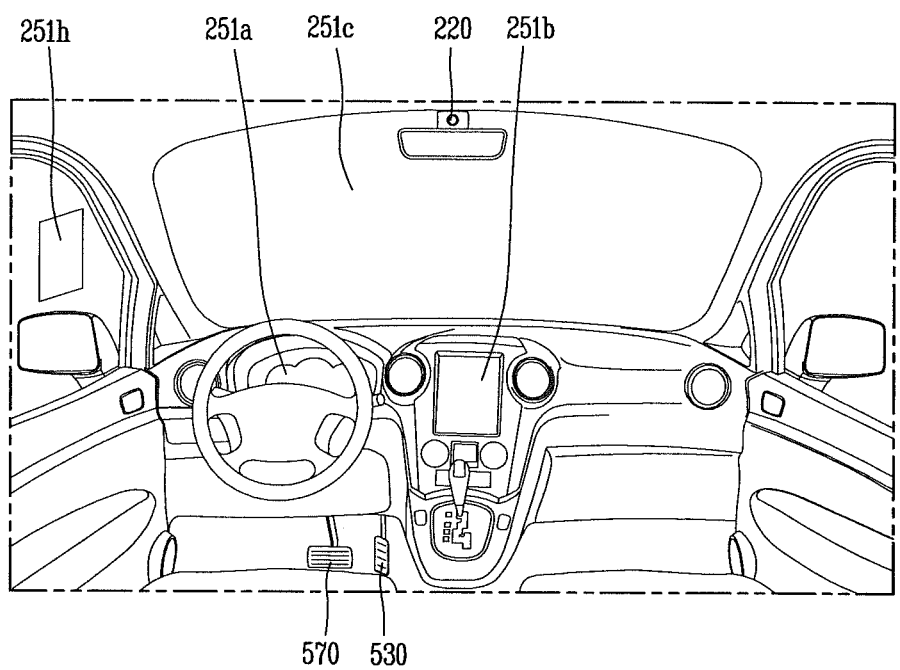
FIGS. 3 and 4 are diagrams illustrating an example interior of a vehicle.
Figure 4:
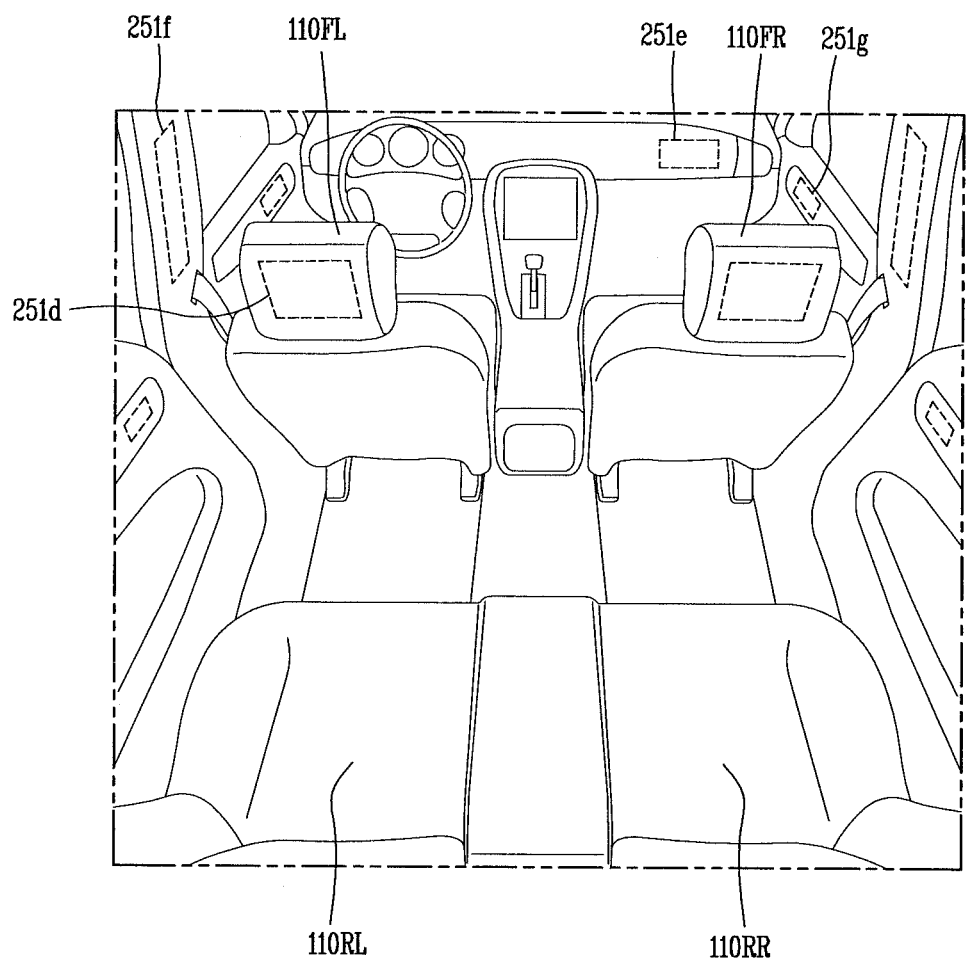
Figure 5:
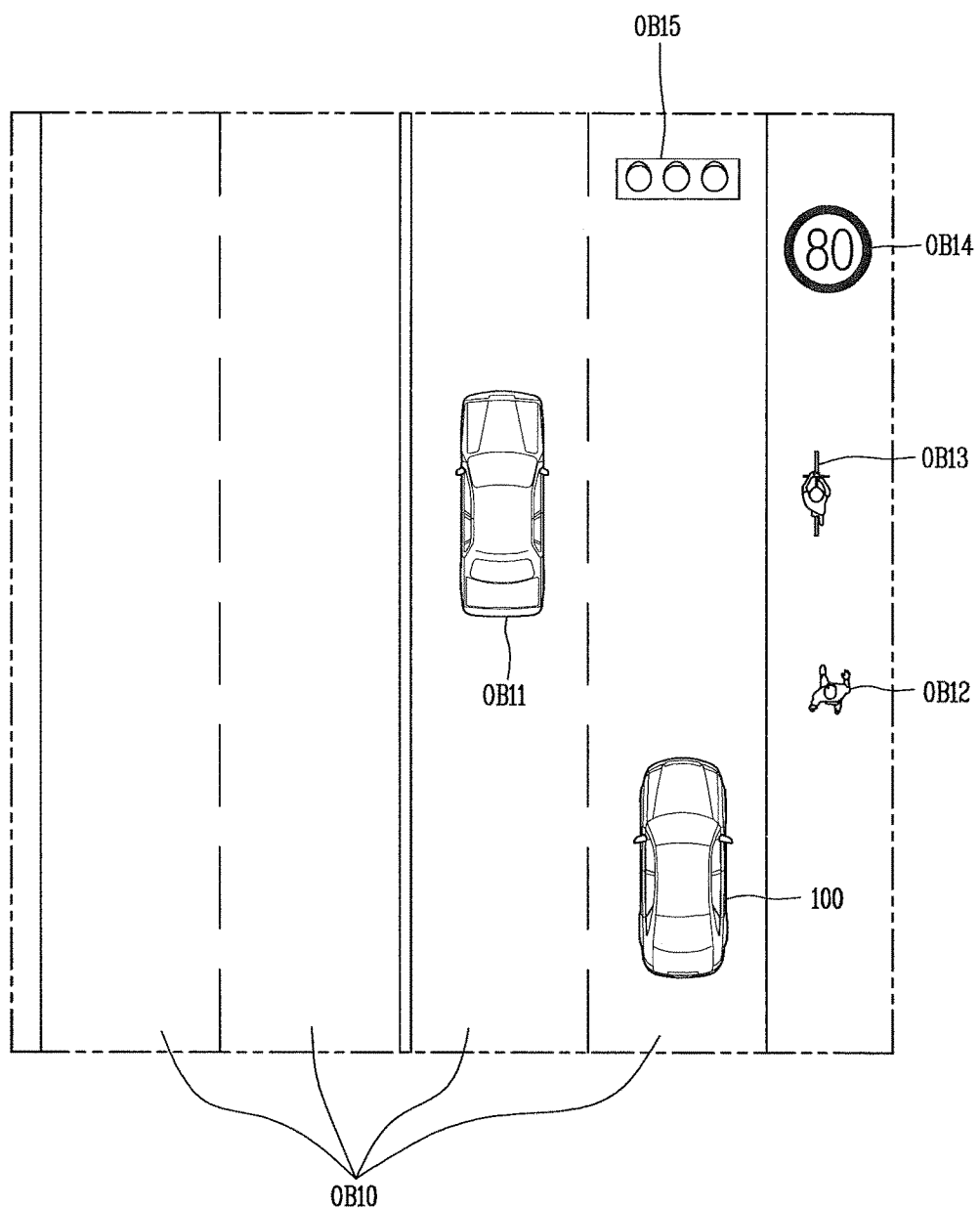
FIGS. 5 and 6 are diagrams illustrating an example vehicle detecting objects outside of the vehicle.
Figure 6:
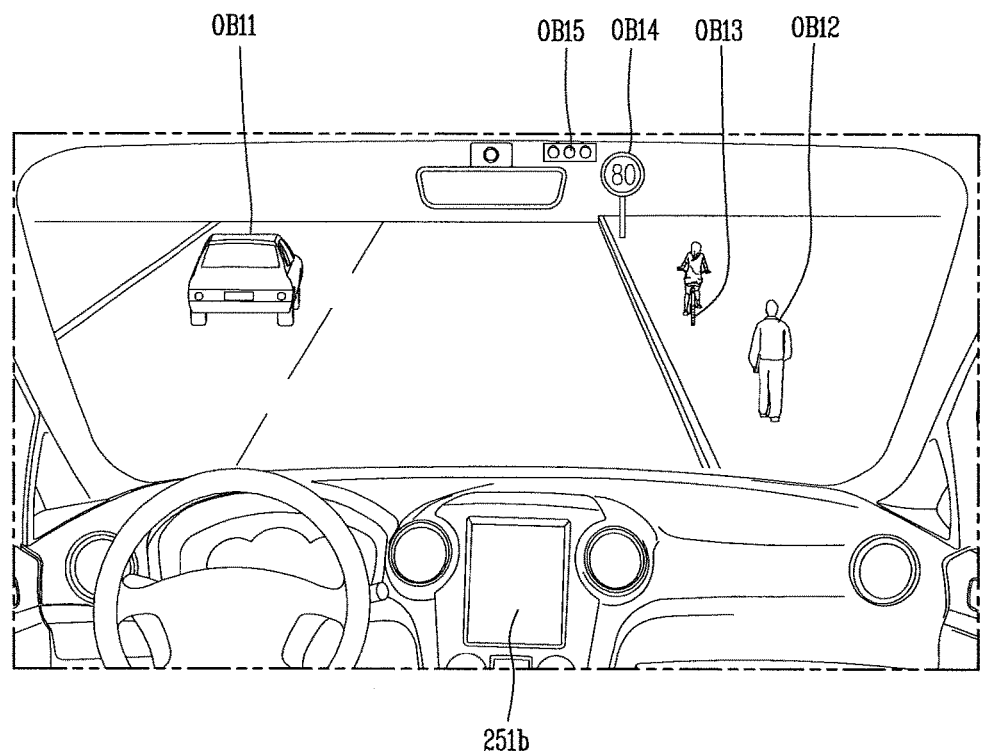
Figure 7:
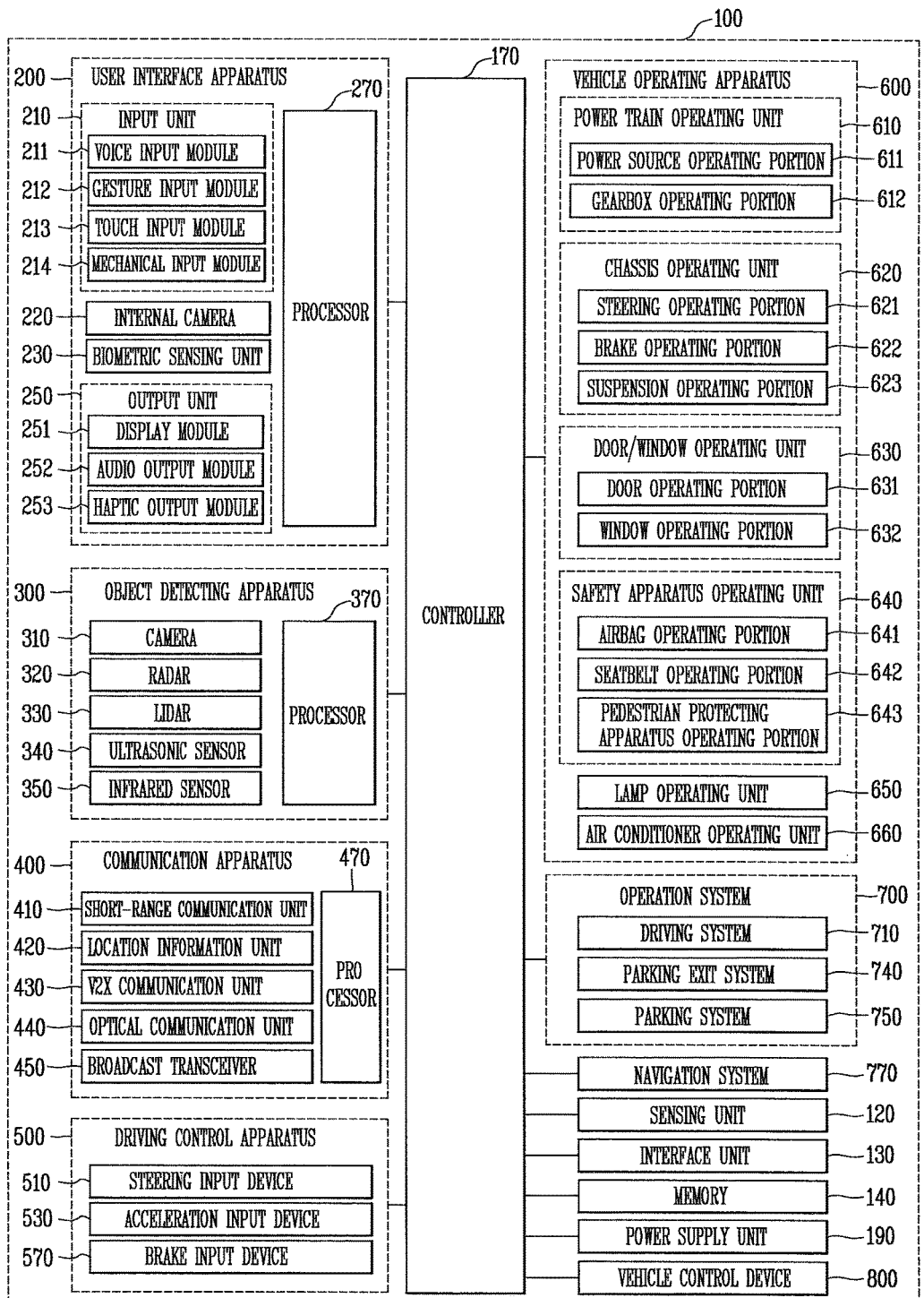
FIG. 7 is a diagram illustrating an example system for a vehicle.

FIG. 1 illustrates an example vehicle. FIG. 2 illustrates an example exterior of a vehicle. FIGS. 3 and 4 illustrate an example interior of a vehicle. FIGS. 5 and 6 illustrate an example vehicle detecting objects outside of the vehicle. FIG. 7 illustrates an example system for a vehicle.

As illustrated in FIGS. 1 to 7, a vehicle 100 may include wheels turning by a driving force, and a steering apparatus 510 for adjusting a driving (ongoing, moving) direction of the vehicle 100. In some implementations, the vehicle 100 can be an autonomous vehicle. In some implementations, the vehicle 100 can be a manually driven vehicle.

The vehicle 100 may be switched into an autonomous mode or a manual mode based on a user input. For example, the vehicle may be converted from the manual mode into the autonomous mode or from the autonomous mode into the manual mode based on a user input received through a user interface apparatus 200.

The vehicle 100 may be switched into the autonomous mode or the manual mode based on driving environment information. The driving environment information may be generated based on object information provided from an object detecting apparatus 300.

For example, the vehicle 100 may be switched from the manual mode into the autonomous mode or from the autonomous module into the manual mode based on driving environment information generated in the object detecting apparatus 300.

As another example, the vehicle 100 may be switched from the manual mode into the autonomous mode or from the autonomous module into the manual mode based on driving environment information received through a communication apparatus 400.

The vehicle 100 may be switched from the manual mode into the autonomous mode or from the autonomous module into the manual mode based on information, data or signal provided from an external device.

When the vehicle 100 is driven in the autonomous mode, the autonomous vehicle 100 may be driven based on an operation system 700.

For example, the autonomous vehicle 100 may be driven based on information, data or signal generated in a driving system 710, a parking exit system 740 and a parking system 750.

When the vehicle 100 is driven in the manual mode, the autonomous vehicle 100 may receive a user input for driving through a driving control apparatus 500. The vehicle 100 may be driven based on the user input received through the driving control apparatus 500.

An overall length refers to a length from a front end to a rear end of the vehicle 100, a width refers to a width of the vehicle 100, and a height refers to a length from a bottom of a wheel to a roof. In the following description, an overall-length direction L may refer to a direction which is a criterion for measuring the overall length of the vehicle 100, a width direction W may refer to a direction that is a criterion for measuring a width of the vehicle 100, and a height direction H may refer to a direction that is a criterion for measuring a height of the vehicle 100.

As illustrated in FIG. 7, the vehicle 100 may include a user interface apparatus 200, an object detecting apparatus 300, a communication apparatus 400, a driving control apparatus 500, a vehicle operating apparatus 600, an operation system 700, a navigation system 770, a sensing unit 120, an interface unit 130, a memory 140, a controller 170 and a power supply unit 190.

In some implementations, the vehicle 100 may include more components in addition to components to be explained in this specification or may not include some of those components to be explained in this specification.

The user interface apparatus 200 is an apparatus for communication between the vehicle 100 and a user. The user interface apparatus 200 may receive a user input and provide information generated in the vehicle 100 to the user. The vehicle 200 may implement user interfaces (UIs) or user experiences (UXs) through the user interface apparatus 200.

The user interface apparatus 200 may include an input unit 210, an internal camera 220, a biometric sensing unit 230, an output unit 250 and a processor 270.

In some implementations, the user interface apparatus 200 may include more components in addition to components to be explained in this specification or may not include some of those components to be explained in this specification.

The input unit 200 may allow the user to input information. Data collected in the input unit 120 may be analyzed by the processor 270 and processed as a user's control command.

The input unit 210 may be disposed within the vehicle. For example, the input unit 200 may be disposed on one area of a steering wheel, one area of an instrument panel, one area of a seat, one area of each pillar, one area of a door, one area of a center console, one area of a headlining, one area of a sun visor, one area of a wind shield, one area of a window or the like.

The input unit 210 may include a voice input module 211, a gesture input module 212, a touch input module 213, and a mechanical input module 214.

The audio input module 211 may convert a user's voice input into an electric signal. The converted electric signal may be provided to the processor 270 or the controller 170.

The voice input module 211 may include at least one microphone.

The gesture input module 212 may convert a user's gesture input into an electric signal. The converted electric signal may be provided to the processor 270 or the controller 170.

The gesture input module 212 may include at least one of an infrared sensor and an image sensor for detecting the user's gesture input.

In some implementations, the gesture input module 212 may detect a user's three-dimensional (3D) gesture input. To this end, the gesture input module 212 may include a light emitting diode outputting a plurality of infrared rays or a plurality of image sensors.

The gesture input module 212 may detect the user's 3D gesture input by a time of flight (TOF) method, a structured light method or a disparity method.

The touch input module 213 may convert the user's touch input into an electric signal. The converted electric signal may be provided to the processor 270 or the controller 170.

The touch input module 213 may include a touch sensor for detecting the user's touch input.

In some implementations, the touch input module 213 may be integrated with the display module 251 so as to implement a touch screen. The touch screen may provide an input interface and an output interface between the vehicle 100 and the user.

The mechanical input module 214 may include at least one of a button, a dome switch, a jog wheel and a jog switch. An electric signal generated by the mechanical input module 214 may be provided to the processor 270 or the controller 170.

The mechanical input module 214 may be arranged on a steering wheel, a center fascia, a center console, a cockpit module, a door and the like.

The internal camera 220 may acquire an internal image of the vehicle. The processor 270 may detect a user's state based on the internal image of the vehicle. The processor 270 may acquire information related to the user's gaze from the internal image of the vehicle. The processor 270 may detect a user gesture from the internal image of the vehicle.

The biometric sensing unit 230 may acquire the user's biometric information. The biometric sensing module 230 may include a sensor for detecting the user's biometric information and acquire fingerprint information and heart rate information regarding the user using the sensor. The biometric information may be used for user authentication.

The output unit 250 may generate an output related to a visual, audible or tactile signal.

The output unit 250 may include at least one of a display module 251, an audio output module 252 and a haptic output module 253.

The display module 251 may output graphic objects corresponding to various types of information.

The display module 251 may include at least one of a liquid crystal display (LCD), a thin film transistor-LCD (TFT LCD), an organic light-emitting diode (OLED), a flexible display, a three-dimensional (3D) display and an e-ink display.

The display module 251 may be inter-layered or integrated with a touch input module 213 to implement a touch screen.

The display module 251 may be implemented as a head up display (HUD). When the display module 251 is implemented as the HUD, the display module 251 may be provided with a projecting module so as to output information through an image which is projected on a windshield or a window.

The display module 251 may include a transparent display. The transparent display may be attached to the windshield or the window.

The transparent display may have a predetermined degree of transparency and output a predetermined screen thereon. The transparent display may include at least one of a thin film electroluminescent (TFEL), a transparent OLED, a transparent LCD, a transmissive transparent display and a transparent LED display. The transparent display may have adjustable transparency.

In some implementations, the user interface apparatus 200 may include a plurality of display modules 251a to 251g.

The display module 251 may be disposed on one area of a steering wheel, one area 521a, 251b, 251e of an instrument panel, one area 251d of a seat, one area 251f of each pillar, one area 251g of a door, one area of a center console, one area of a headlining or one area of a sun visor, or implemented on one area 251c of a windshield or one area 251h of a window.

The audio output module 252 converts an electric signal provided from the processor 270 or the controller 170 into an audio signal for output. To this end, the audio output module 252 may include at least one speaker.

The haptic output module 253 generates a tactile output. For example, the haptic output module 253 may vibrate the steering wheel, a safety belt, a seat 110FL, 110FR, 110RL, 110RR such that the user can recognize such output.

The processor 270 may control an overall operation of each unit of the user interface apparatus 200.

In some implementations, the user interface apparatus 200 may include a plurality of processors 270 or may not include any processor 270.

When the processor 270 is not included in the user interface apparatus 200, the user interface apparatus 200 may operate according to a control of a processor of another apparatus within the vehicle 100 or the controller 170.

In some implementations, the user interface apparatus 200 may be called as a display apparatus for vehicle.

The user interface apparatus 200 may operate according to the control of the controller 170.

The object detecting apparatus 300 is an apparatus for detecting an object located at outside of the vehicle 100.

The object may be a variety of objects associated with driving (operation) of the vehicle 100.

Referring to FIGS. 5 and 6, an object O may include a traffic lane OB10, another vehicle OB11, a pedestrian OB12, a two-wheeled vehicle OB13, traffic signals OB14 and 0615, light, a road, a structure, a speed hump, a geographical feature, an animal and the like.

The lane OB10 may be a driving lane, a lane next to the driving lane or a lane on which another vehicle comes in an opposite direction to the vehicle 100. The lanes OB10 may be a concept including left and right lines forming a lane.

The another vehicle OB11 may be a vehicle which is moving around the vehicle 100. The another vehicle OB11 may be a vehicle located within a predetermined distance from the vehicle 100. For example, the another vehicle OB11 may be a vehicle which moves before or after the vehicle 100.

The pedestrian OB12 may be a person located near the vehicle 100. The pedestrian OB12 may be a person located within a predetermined distance from the vehicle 100. For example, the pedestrian OB12 may be a person located on a sidewalk or roadway.

The two-wheeled vehicle OB13 may refer to a vehicle (transportation facility) that is located near the vehicle 100 and moves using two wheels. The two-wheeled vehicle OB13 may be a vehicle that is located within a predetermined distance from the vehicle 100 and has two wheels. For example, the two-wheeled vehicle OB13 may be a motorcycle or a bicycle that is located on a sidewalk or roadway.

The traffic signals may include a traffic light OB15, a traffic sign OB14 and a pattern or text drawn on a road surface.

The light may be light emitted from a lamp provided on another vehicle. The light may be light generated from a streetlamp. The light may be solar light.

The road may include a road surface, a curve, an upward slope, a downward slope and the like.

The structure may be an object that is located near a road and fixed on the ground. For example, the structure may include a streetlamp, a roadside tree, a building, an electric pole, a traffic light, a bridge and the like.

The geographical feature may include a mountain, a hill and the like.

In some implementations, objects may be classified into a moving object and a fixed object. For example, the moving object may be a concept including another vehicle and a pedestrian. The fixed object may be a concept including a traffic signal, a road and a structure.

The object detecting apparatus 300 may include a camera 310, a radar 320, a LiDAR 330, an ultrasonic sensor 340, an infrared sensor 350 and a processor 370.

In some implementations, the object detecting apparatus 300 may further include other components in addition to the components described, or may not include some of the components described.

The camera 310 may be located on an appropriate portion outside the vehicle to acquire an external image of the vehicle. The camera 310 may be a mono camera, a stereo camera 310a, an around view monitoring (AVM) camera 310b or a 360-degree camera.

For example, the camera 310 may be disposed adjacent to a front windshield within the vehicle to acquire a front image of the vehicle. Or, the camera 310 may be disposed adjacent to a front bumper or a radiator grill.

For example, the camera 310 may be disposed adjacent to a rear glass within the vehicle to acquire a rear image of the vehicle. Or, the camera 310 may be disposed adjacent to a rear bumper, a trunk or a tail gate.

For example, the camera 310 may be disposed adjacent to at least one of side windows within the vehicle to acquire a side image of the vehicle. Or, the camera 310 may be disposed adjacent to a side mirror, a fender or a door.

The camera 310 may provide an acquired image to the processor 370.

The radar 320 may include electric wave transmitting and receiving portions. The radar 320 may be implemented as a pulse radar or a continuous wave radar according to a principle of emitting electric waves. The radar 320 may be implemented in a frequency modulated continuous wave (FMCVV) manner or a frequency shift Keyong (FSK) manner according to a signal waveform, among the continuous wave radar methods.

The radar 320 may detect an object in a time of flight (TOF) manner or a phase-shift manner through the medium of the electric wave, and detect a position of the detected object, a distance from the detected object and a relative speed with the detected object.

The radar 320 may be disposed on an appropriate position outside the vehicle for detecting an object which is located at a front, rear or side of the vehicle.

The LiDAR 330 may include laser transmitting and receiving portions. The LiDAR 330 may be implemented in a time of flight (TOF) manner or a phase-shift manner.

The LiDAR 330 may be implemented as a drive type or a non-drive type.

For the drive type, the LiDAR 330 may rotate by a motor and detect object near the vehicle 100.

For the non-drive type, the LiDAR 330 may detect, through light steering, objects which are located within a predetermined range based on the vehicle 100. The vehicle 100 may include a plurality of non-drive type LiDARs 330.

The LiDAR 330 may detect an object in a TOP manner or a phase-shift manner through the medium of a laser beam, and detect a position of the detected object, a distance from the detected object and a relative speed with the detected object.

The LiDAR 330 may be disposed on an appropriate position outside the vehicle for detecting an object located at the front, rear or side of the vehicle.

The ultrasonic sensor 340 may include ultrasonic wave transmitting and receiving portions. The ultrasonic sensor 340 may detect an object based on an ultrasonic wave, and detect a position of the detected object, a distance from the detected object and a relative speed with the detected object.

The ultrasonic sensor 340 may be disposed on an appropriate position outside the vehicle for detecting an object located at the front, rear or side of the vehicle.

The infrared sensor 350 may include infrared light transmitting and receiving portions. The infrared sensor 340 may detect an object based on infrared light, and detect a position of the detected object, a distance from the detected object and a relative speed with the detected object.

The infrared sensor 350 may be disposed on an appropriate position outside the vehicle for detecting an object located at the front, rear or side of the vehicle.

The processor 370 may control an overall operation of each unit of the object detecting apparatus 300.

The processor 370 may detect an object based on an acquired image, and track the object. The processor 370 may execute operations, such as a calculation of a distance from the object, a calculation of a relative speed with the object and the like, through an image processing algorithm.

The processor 370 may detect an object based on a reflected electromagnetic wave which an emitted electromagnetic wave is reflected from the object, and track the object. The processor 370 may execute operations, such as a calculation of a distance from the object, a calculation of a relative speed with the object and the like, based on the electromagnetic wave.

The processor 370 may detect an object based on a reflected laser beam which an emitted laser beam is reflected from the object, and track the object. The processor 370 may execute operations, such as a calculation of a distance from the object, a calculation of a relative speed with the object and the like, based on the laser beam.

The processor 370 may detect an object based on a reflected ultrasonic wave which an emitted ultrasonic wave is reflected from the object, and track the object. The processor 370 may execute operations, such as a calculation of a distance from the object, a calculation of a relative speed with the object and the like, based on the ultrasonic wave.

The processor 370 may detect an object based on reflected infrared light which emitted infrared light is reflected from the object, and track the object. The processor 370 may execute operations, such as a calculation of a distance from the object, a calculation of a relative speed with the object and the like, based on the infrared light.

In some implementations, the object detecting apparatus 300 may include a plurality of processors 370 or may not include any processor 370. For example, each of the camera 310, the radar 320, the LiDAR 330, the ultrasonic sensor 340 and the infrared sensor 350 may include the processor in an individual manner.

When the processor 370 is not included in the object detecting apparatus 300, the object detecting apparatus 300 may operate according to the control of a processor of an apparatus within the vehicle 100 or the controller 170.

The object detecting apparatus 300 may operate according to the control of the controller 170.

The communication apparatus 400 is an apparatus for performing communication with an external device. In this example, the external device may be another vehicle, a mobile terminal or a server.

The communication apparatus 400 may perform the communication by including at least one of a transmitting antenna, a receiving antenna, and radio frequency (RF) circuit and RF device for implementing various communication protocols.

The communication apparatus 400 may include a short-range communication unit 410, a location information unit 420, a V2X communication unit 430, an optical communication unit 440, a broadcast transceiver 450 and a processor 470.

In some implementations, the communication apparatus 400 may further include other components in addition to the components described, or may not include some of the components described.

The short-range communication unit 410 is a unit for facilitating short-range communications. Suitable technologies for implementing such short-range communications include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like.

The short-range communication unit 410 may construct short-range area networks to perform short-range communication between the vehicle 100 and at least one external device.

The location information unit 420 is a unit for acquiring position information. For example, the location information unit 420 may include a Global Positioning to System (GPS) module or a Differential Global Positioning System (DGPS) module.

The V2X communication unit 430 is a unit for performing wireless communications with a server (Vehicle to Infra; V2I), another vehicle (Vehicle to Vehicle; V2V), or a pedestrian (Vehicle to Pedestrian; V2P). The V2X communication unit 430 may include an RF circuit implementing a communication protocol with the infra (V2I), a communication protocol between the vehicles (V2V) and a communication protocol with a pedestrian (V2P).

The optical communication unit 440 is a unit for performing communication with an external device through the medium of light. The optical communication unit 440 may include a light-emitting diode for converting an electric signal into an optical signal and sending the optical signal to the exterior, and a photodiode for converting the received optical signal into an electric signal.

In some implementations, the light-emitting diode may be integrated with lamps provided on the vehicle 100.

The broadcast transceiver 450 is a unit for receiving a broadcast signal from an external broadcast managing entity or transmitting a broadcast signal to the broadcast managing entity via a broadcast channel. The broadcast channel may include a satellite channel, a terrestrial channel, or both. The broadcast signal may include a TV broadcast signal, a radio broadcast signal and a data broadcast signal.

The processor 470 may control an overall operation of each unit of the communication apparatus 400.

In some implementations, the communication apparatus 400 may include a plurality of processors 470 or may not include any processor 470.

When the processor 470 is not included in the communication apparatus 400, the communication apparatus 400 may operate according to the control of a processor of another device within the vehicle 100 or the controller 170.

In some implementations, the communication apparatus 400 may implement a display apparatus for a vehicle together with the user interface apparatus 200. In this instance, the display apparatus for the vehicle may be referred to as a telematics apparatus or an Audio Video Navigation (AVN) apparatus.

The communication apparatus 400 may operate according to the control of the controller 170.

The driving control apparatus 500 is an apparatus for receiving a user input for driving.

In a manual mode, the vehicle 100 may be operated based on a signal provided by the driving control apparatus 500.

The driving control apparatus 500 may include a steering input device 510, an acceleration input device 530 and a brake input device 570.

The steering input device 510 may receive an input regarding a driving (ongoing) direction of the vehicle 100 from the user. The steering input device 510 is preferably configured in the form of a wheel allowing a steering input in a rotating manner. In some implementations, the steering input device may also be configured in a shape of a touch screen, a touchpad or a button.

The acceleration input device 530 may receive an input for accelerating the vehicle 100 from the user. The brake input device 570 may receive an input for braking the vehicle 100 from the user. Each of the acceleration input device 530 and the brake input device 570 is preferably configured in the form of a pedal. In some implementations, the acceleration input device or the brake input device may also be configured in a shape of a touch screen, a touchpad or a button.

The driving control apparatus 500 may operate according to the control of the controller 170.

The vehicle operating apparatus 600 is an apparatus for electrically controlling operations of various devices within the vehicle 100.

The vehicle operating apparatus 600 may include a power train operating unit 610, a chassis operating unit 620, a door/window operating unit 630, a safety apparatus operating unit 640, a lamp operating unit 650, and an air-conditioner operating unit 660.

In some implementations, the vehicle operating apparatus 600 may further include other components in addition to the components described, or may not include some of the components described.

In some implementations, the vehicle operating apparatus 600 may include a processor. Each unit of the vehicle operating apparatus 600 may individually include a processor.

The power train operating unit 610 may control an operation of a power train device.

The power train operating unit 610 may include a power source operating portion 611 and a gearbox operating portion 612.

The power source operating portion 611 may perform a control for a power source of the vehicle 100.

For example, upon using a fossil fuel-based engine as the power source, the power source operating portion 611 may perform an electronic control for the engine. Accordingly, an output torque and the like of the engine can be controlled. The power source operating portion 611 may adjust the engine output torque according to the control of the controller 170.

For example, upon using an electric energy-based motor as the power source, the power source operating portion 611 may perform a control for the motor. The power source operating portion 611 may adjust a rotating speed, a torque and the like of the motor according to the control of the controller 170.

The gearbox operating portion 612 may perform a control for a gearbox.

The gearbox operating portion 612 may adjust a state of the gearbox. The gearbox operating portion 612 may change the state of the gearbox into drive (forward) (D), reverse (R), neutral (N) or parking (P).

In some implementations, when an engine is the power source, the gearbox operating portion 612 may adjust a locked state of a gear in the drive (D) state.

The chassis operating unit 620 may control an operation of a chassis device.

The chassis operating unit 620 may include a steering operating portion 621, a brake operating portion 622 and a suspension operating portion 623.

The steering operating portion 621 may perform an electronic control for a steering apparatus within the vehicle 100. The steering operating portion 621 may change a driving direction of the vehicle.

The brake operating portion 622 may perform an electronic control for a brake apparatus within the vehicle 100. For example, the brake operating portion 622 may control an operation of brakes provided at wheels to reduce speed of the vehicle 100.

In some implementations, the brake operating portion 622 may individually control each of a plurality of brakes. The brake operating portion 622 may differently control braking force applied to each of a plurality of wheels.

The suspension operating portion 623 may perform an electronic control for a suspension apparatus within the vehicle 100. For example, the suspension operating portion 623 may control the suspension apparatus to reduce vibration of the vehicle 100 when a bump is present on a road.

In some implementations, the suspension operating portion 623 may individually control each of a plurality of suspensions.

The door/window operating unit 630 may perform an electronic control for a door apparatus or a window apparatus within the vehicle 100.

The door/window operating unit 630 may include a door operating portion 631 and a window operating portion 632.

The door operating portion 631 may perform the control for the door apparatus. The door operating portion 631 may control opening or closing of a plurality of doors of the vehicle 100. The door operating portion 631 may control opening or closing of a trunk or a tail gate. The door operating portion 631 may control opening or closing of a sunroof.

The window operating portion 632 may perform the electronic control for the window apparatus. The window operating portion 632 may control opening or closing of a plurality of windows of the vehicle 100.

The safety apparatus operating unit 640 may perform an electronic control for various safety apparatuses within the vehicle 100.

The safety apparatus operating unit 640 may include an airbag operating portion 641, a seatbelt operating portion 642 and a pedestrian protecting apparatus operating portion 643.

The airbag operating portion 641 may perform an electronic control for an airbag apparatus within the vehicle 100. For example, the airbag operating portion 641 may control the airbag to be deployed upon a detection of a risk.

The seatbelt operating portion 642 may perform an electronic control for a seatbelt apparatus within the vehicle 100. For example, the seatbelt operating portion 642 may control passengers to be motionlessly seated in seats 110FL, 110FR, 110RL, 110RR using seatbelts upon a detection of a risk.

The pedestrian protecting apparatus operating portion 643 may perform an electronic control for a hood lift and a pedestrian airbag. For example, the pedestrian protecting apparatus operating portion 643 may control the hood lift and the pedestrian airbag to be open up upon detecting pedestrian collision.

The lamp operating unit 650 may perform an electronic control for various lamp apparatuses within the vehicle 100.

The air-conditioner operating unit 660 may perform an electronic control for an air conditioner within the vehicle 100. For example, the air-conditioner operating unit 660 may control the air conditioner to supply cold air into the vehicle when internal temperature of the vehicle is high.

The vehicle operating apparatus 600 may include a processor. Each unit of the vehicle operating apparatus 600 may individually include a processor.

The vehicle operating apparatus 600 may operate according to the control of the controller 170.

The operation system 700 is a system that controls various driving modes of the vehicle 100. The operation system 700 may operate in an autonomous driving mode.

The operation system 700 may include a driving system 710, a parking exit system 740 and a parking system 750.

In some implementations, the operation system 700 may further include other components in addition to components to be described, or may not include some of the components to be described.

In some implementations, the operation system 700 may include a processor. Each unit of the operation system 700 may individually include a processor.

In some implementations, the operation system may be a sub concept of the controller 170 when it is implemented in a software configuration.

In some implementations, in some implementations, the operation system 700 may be a concept including at least one of the user interface apparatus 200, the object detecting apparatus 300, the communication apparatus 400, the vehicle operating apparatus 600 and the controller 170.

The driving system 710 may perform driving of the vehicle 100.

The driving system 710 may receive navigation information from a navigation system 770, transmit a control signal to the vehicle operating apparatus 600, and perform driving of the vehicle 100.

The driving system 710 may receive object information from the object detecting apparatus 300, transmit a control signal to the vehicle operating apparatus 600 and perform driving of the vehicle 100.

The driving system 710 may receive a signal from an external device through the communication apparatus 400, transmit a control signal to the vehicle operating apparatus 600, and perform driving of the vehicle 100.

The parking exit system 740 may perform an exit of the vehicle 100 from a parking lot.

The parking exit system 740 may receive navigation information from the navigation system 770, transmit a control signal to the vehicle operating apparatus 600, and perform the exit of the vehicle 100 from the parking lot.

The parking exit system 740 may receive object information from the object detecting apparatus 300, transmit a control signal to the vehicle operating apparatus 600 and perform the exit of the vehicle 100 from the parking lot.

The parking exit system 740 may receive a signal from an external device through the communication apparatus 400, transmit a control signal to the vehicle operating apparatus 600, and perform the exit of the vehicle 100 from the parking lot.

The parking system 750 may perform parking of the vehicle 100.

The parking system 750 may receive navigation information from the navigation system 770, transmit a control signal to the vehicle operating apparatus 600, and park the vehicle 100.

The parking system 750 may receive object information from the object detecting apparatus 300, transmit a control signal to the vehicle operating apparatus 600 and park the vehicle 100.

The parking system 750 may receive a signal from an external device through the communication apparatus 400, transmit a control signal to the vehicle operating apparatus 600, and park the vehicle 100.

The navigation system 770 may provide navigation information. The navigation information may include at least one of map information, information regarding a set destination, path information according to the set destination, information regarding various objects on a path, lane information and current location information of the vehicle.

The navigation system 770 may include a memory and a processor. The memory may store the navigation information. The processor may control an operation of the navigation system 770.

In some implementations, the navigation system 770 may update prestored information by receiving information from an external device through the communication apparatus 400.

In some implementations, the navigation system 770 may be classified as a sub component of the user interface apparatus 200.

The sensing unit 120 may sense a status of the vehicle. The sensing unit 120 may include a posture sensor (e.g., a yaw sensor, a roll sensor, a pitch sensor, etc.), a collision sensor, a wheel sensor, a speed sensor, a tilt sensor, a weight-detecting sensor, a heading sensor, a gyro sensor, a position module, a vehicle forward/backward movement sensor, a battery sensor, a fuel sensor, a tire sensor, a steering sensor by a turn of a handle, a vehicle internal temperature sensor, a vehicle internal humidity sensor, an ultrasonic sensor, an illumination sensor, an accelerator position sensor, a brake pedal position sensor, and the like.

The sensing unit 120 may acquire sensing signals with respect to vehicle-related information, such as a posture, a collision, an orientation, a position (GPS information), an angle, a speed, an acceleration, a tilt, a forward/backward movement, a battery, a fuel, tires, lamps, internal temperature, internal humidity, a rotated angle of a steering wheel, external illumination, pressure applied to an accelerator, pressure applied to a brake pedal and the like.

The sensing unit 120 may further include an accelerator sensor, a pressure sensor, an engine speed sensor, an air flow sensor (AFS), an air temperature sensor (ATS), a water temperature sensor (WTS), a throttle position sensor (TPS), a TDC sensor, a crank angle sensor (CAS), and the like.

The interface unit 130 may serve as a path allowing the vehicle 100 to interface with various types of external devices coupled thereto. For example, the interface unit 130 may be provided with a port connectable with a mobile terminal, and coupled to the mobile terminal through the port. In this instance, the interface unit 130 may exchange data with the mobile terminal.

In some implementations, the interface unit 130 may serve as a path for supplying electric energy to the coupled mobile terminal. When the mobile terminal is electrically coupled to the interface unit 130, the interface unit 130 supplies electric energy supplied from a power supply unit 190 to the mobile terminal according to the control of the controller 170.

The memory 140 is electrically coupled to the controller 170. The memory 140 may store basic data for units, control data for controlling operations of units and input/output data. The memory 140 may be a variety of storage devices, such as ROM, RAM, EPROM, a flash drive, a hard drive and the like in a hardware configuration. The memory 140 may store various data for overall operations of the vehicle 100, such as programs for processing or controlling the controller 170.

In some implementations, the memory 140 may be integrated with the controller 170 or implemented as a sub component of the controller 170.

The controller 170 may control an overall operation of each unit of the vehicle 100. The controller 170 may be referred to as an Electronic Control Unit (ECU).

The power supply unit 190 may supply power required for an operation of each component according to the control of the controller 170. Specifically, the power supply unit 190 may receive power supplied from an internal battery of the vehicle, and the like.

At least one processor and the controller 170 included in the vehicle 100 may be implemented using at least one of application specific integrated circuits (ASICs), digital signal processors (DSPs), digital signal processing devices (DSPDs), programmable logic devices (PLDs), field programmable gate arrays (FPGAs), processors, controllers, micro controllers, microprocessors, and electric units performing other functions.

In some implementations, the vehicle 100 may include a lamp 800 for a vehicle. In detail, the lamp 800 for the vehicle may include every lamp provided on the vehicle 100.

The lamp 800 for the vehicle may include a head lamp provided on the front of the vehicle 100. The head lamp may be provided on at least one of left and right sides of the front of the vehicle 100. The head lamp may be configured to output light toward at least one of front, front left and front right sides of the vehicle 100.

The head lamp may include at least one of a low-beam output module (low-beam lamp), a high-beam output module (high-beam lamp), a turn indicator lamp, an emergency lamp, a fog lamp, a corner lamp and the like.

Also, the lamp 800 for the vehicle may include a rear lamp (or a rear combination lamp) provided on the rear of the vehicle 100. The rear lamp may be provided on at least one of rear left and rear right sides of the vehicle 100, or integrally formed on a rear surface of the vehicle 100. The rear lamp may be configured to output (emit, produce) light toward at least one of rear, rear left and rear right sides of the vehicle 100.

The rear lamp may include at least one of a brake lamp, a backup lamp, a turn indicator lamp and a tail lamp.

Also, the lamp 800 for the vehicle may include a side lamp provided on a side surface of the vehicle. For example, the side lamp may include a turn indicator lamp (or emergency lamp) provided on a side mirror of the vehicle.

The lamp 800 for the vehicle may be arranged adjacent to a lamp module forming a high or low beam pattern, a positioning lamp, a daytime running lamp (DRL), an adaptive front lighting system (AFLS) and the like, or provided as a separate form.

As such, the lamp 800 for the vehicle described in this specification may be applied to every type of lamp which can be equipped on the vehicle.

In some implementations, the lamp for a vehicle can include a processor for controlling the lamp 800 for the vehicle. The processor may be the lamp operating unit 650 illustrated in FIG. 7 or the controller 170. In some implementations, the processor can be a separate processor provided in the lamp 800 for the vehicle.

In this specification, the processor 870 is described to control the lamp 800 for a vehicle and the processor 870 is part of the lamp 800. However, in some implementations, contents, functions, or features associated with the processor 870 can be performed by an external controller such as the lamp operating unit 650 or the controller 170.

The processor 870 may also receive a control signal for controlling the lamp 800 for the vehicle, or generate a control signal for controlling the lamp 800 for the vehicle based on an ADAS function.

The processor 870 may control the power supply unit 190 to supply power to the lamp 800 for the vehicle, on the basis of the control signal.

The processor 870 may also control operations of a light source unit 810 and a reflection unit 820 provided in the lamp 800 for the vehicle, on the basis of the control signal.

Figure 8:
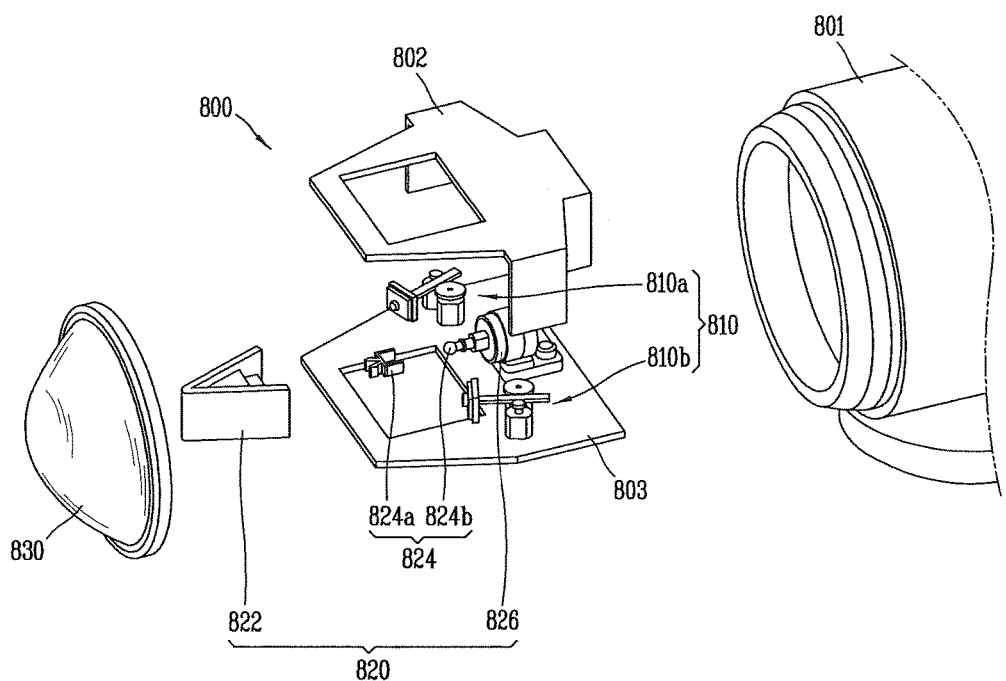
FIG. 8 is a diagram illustrating an example lamp for a vehicle.

FIG. 8 is a diagram illustrating an example lamp for a vehicle.

The lamp 800 for the vehicle may include a case 801, an upper plate 802 and a lower plate 803.

The upper plate 802 and the lower plate 803 may be provided within the case 801.

In detail, at least part of the upper plate 802 and the lower plate 803 may be arranged within the case 801.

Various components are arranged within an inner space formed by coupling at least two of the case 801, the upper plate 802 and the lower plate 803.

For example, when the upper plate 802 and the lower plate 803 are disposed within the case 801, the upper plate 802 and the lower plate 803 may be coupled to each other, and the coupling may result in forming an inner space between the upper plate 802 and the lower plate 803.

Various components included in the lamp for the vehicle may be arranged (disposed) in the inner space formed by the upper plate 802 and the lower plate 803. For example, components coupled to at least one of the upper plate 802 and the lower plate 803 may include a light source unit 810, a reflection unit 820, a battery, a processor 870, a lens 830 and the like.

The lens 830 for covering the components (e.g., the light source unit 810, the reflection unit 820) provided on the upper plate 802 or the lower plate 803 may detachably be coupled to the case 801. Hence, when the lens 830 is detached from the case 801, the light source unit 810 and the reflection unit 820 (or the upper plate 802 and the lower plate 803) provided within the case 801 may be externally exposed.

In more detail, the lamp 800 for the vehicle may include the light source unit 810 having at least two light modules 810*a* and 810*b*. The light modules 810*a* and 810*b* may include light sources 811*a* and 811*b* (see FIG. 10) of outputting (emitting) light (beams), respectively.

That is, the light source unit 810 may include at least two light sources 811*a* and 811*b* by virtue of employing the at least two light modules 810*a* and 810*b*. In other words, the lamp 800 for the vehicle may include the light source unit 810 having the at least two light sources 811*a* and 811*b*.

The at least two light modules 810*a* and 810*b* may be coupled to at least one of the upper plate 802 and the lower plate 803. That is, the light modules 810*a* and 810*b* may be coupled to the upper plate 802, to the lower plate 803, or to both of the upper plate 802 and the lower plate 803.

The light sources 811*a* and 811*b* of outputting light may be implemented using various types of light sources. For example, the light sources 811*a* and 811*b* may be halogen light sources, LEDs, micro LEDs, matrix LEDs, laser diodes (LDs) and the like. Besides, the light sources 811*a* and 811*b* may include every type of object capable of emitting light.

Also, the lamp 800 for the vehicle may include the reflection unit 820, which is provided with a reflector 822 located between the at least two light sources 811*a* and 811*b* (or the at least two light modules 810*a* and 810*b*) to reflect the light emitted from the at least two light sources 811*a* and 811*b*.

The reflection unit 820, as illustrated in FIG. 8, may include the reflector 822 for reflecting the light generated from the light sources 811*a* and 811*b* provided in the lamp for the vehicle, a pivot coupling portion 824 coupled to the reflector 822, and an actuator 826 coupled to the pivot coupling portion 824.

The at least two light sources 811*a* and 811*b* (or the at least two light modules 810*a* and 810*b*) may be arranged in a symmetrical manner based on the reflection unit 820 (or the reflector 822).

For example, the at least two light sources 811*a* and 811*b* may be symmetrically arranged with being spaced apart from the reflector 822 by predetermined distances, respectively.

This specification illustrates that at least two light sources are arranged to be symmetrical to each other in left and right directions based on the reflector. However, in some implementations, the lamp for the vehicle may have any structure as long as the at least two light sources are symmetrically arranged based on the reflector.

For example, when the lamp for the vehicle is provided with at least three light sources, the at least three light sources may be spaced apart from the reflector (or the reflection unit) by predetermined distances, respectively, and distances among the at least three light sources may be uniform. This arrangement may refer to that the at least three light sources are arranged symmetrically based on the reflector (or the reflection unit).

The lamp 800 for the vehicle may include the at least two light sources 811*a* and 811*b* arranged to face a point between a front surface of the lamp and the reflector 822. In detail, the at least two light sources 811*a* and 811*b* may be arranged in a state of being turned toward the reflector 822 by a predetermined angle based on the front surface of the lamp 800 for the vehicle.

Accordingly, an optical axis of light emitted from each of the at least two light sources may extend toward the reflector 822 by a predetermined angle based on the front surface of the lamp 800 for the vehicle.

Therefore, the light emitted from the at least two light sources 811*a* and 811*b* can be reflected by the reflector 822, and the reflected light can be incident on the lens 830.

Also, the reflector 822 may be configured to intensively reflect light emitted from the at least two light sources 811*a* and 811*b* toward a predetermined region of an incident surface of the lens. To this end, the reflector 822 may be provided with a plurality of reflective surfaces. Also, each of the reflective surfaces may be arranged to face the light sources and the lens, as illustrated in FIG. 8.

The lens 830 may transmit, to the outside of the lamp 800 for the vehicle, direct light that is generated from each of the at least two light sources 811*a* and 811*b* and directly incident and reflected light which is generated from each of the at least two light sources 811*a* and 811*b* and incident by being reflected by the reflector 822.

To this end, the lens 830 may be arranged at a front side of the at least two light sources 811*a* and 811*b* and the reflector 822. In this example, the front side F may refer to a direction along which light emitted from the lamp 800 for the vehicle goes, in detail, an incident direction of the light emitted from the light sources 811*a* and 811*b*.

That is, the front side F may refer to a direction extending from the reflector 822 to the lens 830.

The front side, for example, may refer to the front of the vehicle 100 when the lamp 800 for the vehicle is provided on a front portion of the vehicle 100, or the rear of the vehicle 100 when the lamp 800 for the vehicle is provided on a rear portion of the vehicle 100.

The lens 830 may include an incident surface on which light is incident by the at least two light sources 811*a* and 811*b* and the reflector 822, and an exit surface from which the incident light is output (transmitted) to the outside of the lamp for the vehicle. The incident surface of the lens 830 may be located at a portion facing the light source unit 810 and the reflection unit 820, and the exit surface of the lens 830 may be located at an opposite side to the incident surface (i.e., the outside of the lamp 800 for the vehicle).

The lens 830 may transmit the direct light emitted from the at least two light sources 811 and 811*b* and the reflected light reflected by the reflector 822.

In detail, the incident surface of the lens 830 may include a first region 1710 (see FIG. 17) and a second region 1720 (see FIG. 17) to which light emitted from each of the at least two light sources 811*a* and 811*b* is directly incident (i.e., direct light is incident). The incident surface of the lens 830 may also include a third region 1730 (see FIG. 17) (the aforementioned predetermined region) to which the reflected light, which is first emitted from each of the at least two light sources 811*a* and 811*b* and then reflected by the reflector 822, is incident.

The first to third regions 1710, 1720 and 1730 which are a plurality of incident regions may be formed on different positions (portions). The first to third regions 1710, 1720 and 1730 on the incident surface of the lens 830 may refer to regions where a quantity of incident light is more than a predetermined (or specific) quantity.

Also, the first to third regions 1710, 1720 and 1730 may refer to regions where brightness of light incident to the incident light of the lens 830 is more than a preset brightness (or specific brightness).

The first region 1710 and the second region 1720 may refer to incident regions to which direct light of each of the at least two light sources 811a and 811b provided at the different locations is incident.

The third region 1730 may refer to an incident region to which light emitted from each of the at least two light sources 811a and 811b and then reflected by the reflection unit 820 (in detail, the reflector 822) is incident.

For example, the first and second regions 1710 and 1720 may be formed on both sides of the lens 830, and the third region 1730 may be formed on a central portion of the lens 830. That is, the first to third regions 1710, 1720 and 1730 may be formed on different positions or portions.

The first to third regions may be referred to as light spots, respectively.

The reflection unit 820 (or the reflector 822) allows the light emitted from each of the at least two light sources 811a and 811b, arranged adjacent to the reflection unit 820, to be directed to the third region 1730. That is, the reflection unit 820 may serve to concentrate light emitted from each of the at least two light sources 811a and 811b on an arbitrary region.

That is, the lamp 800 for the vehicle may include the lens 830 that is configured such that the direct light emitted from each of the at least two light sources 811a and 811b is incident to the first region 1710 and the second region 1720, and the reflected light emitted from each of the light sources 811a and 811b and then reflected by the reflector 822 is incident to the third region 1730 different from the first and second regions 1710 and 1720.

The lens 830 may externally transmit light incident on the first to third regions 1710, 1720 and 1730 of the incident surface. In this instance, the lens 830 may be configured such that the light incident on each of the first to third regions 1710, 1720 and 1730 can be concentrated (or collected) and then output without being spread. That is, the lens 830 may allow the light to go straightly for output in a magnitude (size) corresponding to a size of an incident region of the incident surface. To this end, a curvature, a material, a shape and the like of the lens 830 may variously be implemented, and an additional lens (or dispersion-preventing member) for preventing dispersion (refraction) of light may further be provided.

In some implementations, the lamp for a vehicle can produce light patterns (beam patterns) more than the number of light sources by using a less number of light sources. That is, the lamp for the vehicle can generate more light spots (or beam or light patterns) than the number of light sources by additionally forming the third region 1730 using the reflection unit 820 (or the reflector 822).

In some implementations, the reflector 822 can turn (pivot) centering on one center point or linearly move along the axis to change at least one of a size and a center position of the third region.

In some implementations, at least one of the at least two light sources turns or rotates centering on one center point of at least one of the at least two light sources to move linearly along an axis, so as to vary (change) at least one of the size of the third region and the center position.

In addition to the third region 1730, a size and/or center position of at least one of the first region 1710 and the second region 1720 may also vary when at least one of the at least two light sources is rotated centering on one center point or one axis.

In some implementations, at least one of the at least two light sources 811a and 811b and the reflector 822 can rotate centering on one center point or linearly moved based on one axis, in order to change the size and the center position of the third region (and/or the first and second regions).

In other words, the reflector 822 may be arranged between the at least two light sources 811a and 811b (or the plurality of light sources) in one direction. Also, at least one of the reflector 822 and the at least two light sources 811a and 811b may be configured to be movable along another direction different from the one direction or rotatable centering on one center point (or one axis).

This is to vary the size and/or the center position of at least one of the first and second regions 1710 and 1720 to which light emitted from each of the at least two light sources 811a and 811b is incident, and the third region 1730 to which light emitted from each of the at least two light sources and then reflected by the reflector 822 is incident.

The processor 870 may control at least one of the light source unit 810 and the reflection unit 820 such that the size or center position of at least one of the first to third regions 1710, 1720 and the 1730 can be changed.

Figure 9:
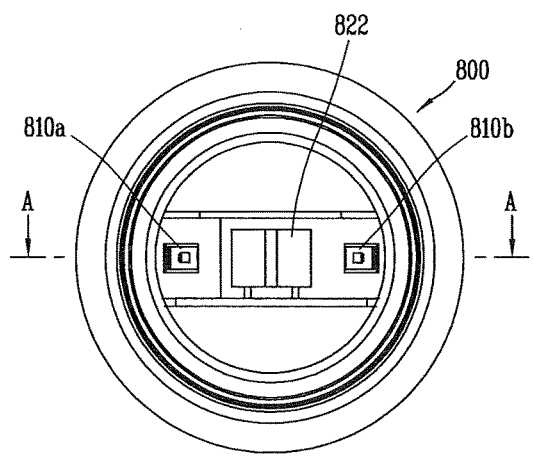
FIG. 9 is a diagram illustrating an example lamp for a vehicle.

FIG. 9 illustrates an example lamp for a vehicle.

As illustrated in FIG. 9, viewing the lamp 800 for the vehicle from a front surface, the at least two light sources 811a and 811b and the reflector 822 may be visible through the transparent lens 830.

Direct light which is emitted from each of the at least two light sources 811a and 811b and incident to the first region 1710 and the second region 1720 of the lens 830, and reflected light which is emitted from each of the at least two light sources 811a and 811b, reflected by the reflector 822 and incident to the third region 1730 of the lens 830 may externally be output through the lens 830.

In this instance, the lens 830 may have light transmittance more than a predetermined value such that the direct light and the reflected light can be externally output through the lens 830.

Also, the lens 830 may further be provided with a fluorescent material which can change colors of the direct light and the reflected light, or a transmission material which can control light transmittance.

As aforementioned, the lens 830 may be configured to concentrate light incident to the first to third regions 1710, 1720 and 1730 for output in a manner of maintaining linearity of the light without dispersion.

In this instance, the lamp 800 for the vehicle may vary at least one of a size and a center position of the first region 1710 and/or the second region 1720 by rotating or linearly moving the at least two light sources 811a and 811b under the control of the processor 870.

Also, the lamp 800 for the vehicle may vary at least one of the size and the center position of the third region 1730 by rotating or linearly moving the reflector 822 or changing an angle (inclination) of a reflective surface of the reflector 822, under the control of the processor 870.

The first to the third regions 1710, 1720 and 1730 represent the regions on a surface of the lens to which the direct light or reflected light is incident.

An exit surface of the lens 830 of the lamp 800 for the vehicle may have regions corresponding to the first to third regions 1710, 1720 and 1730 of the incident surface. Those regions of the exit surface may have sizes and center positions at least one of which can be varied, in response to the variation of at least one of the sizes and the center positions of the first to third regions 1710, 720 and 1730.

The size or the center position of the first region (or the second and the third regions) can be changed. That is, a size or a center position (or output direction) of light that is incident to the first region (or the second and the third regions) is changed and is output to the outside of the lamp 800 for the vehicle through the lens 830.

Figure 10:
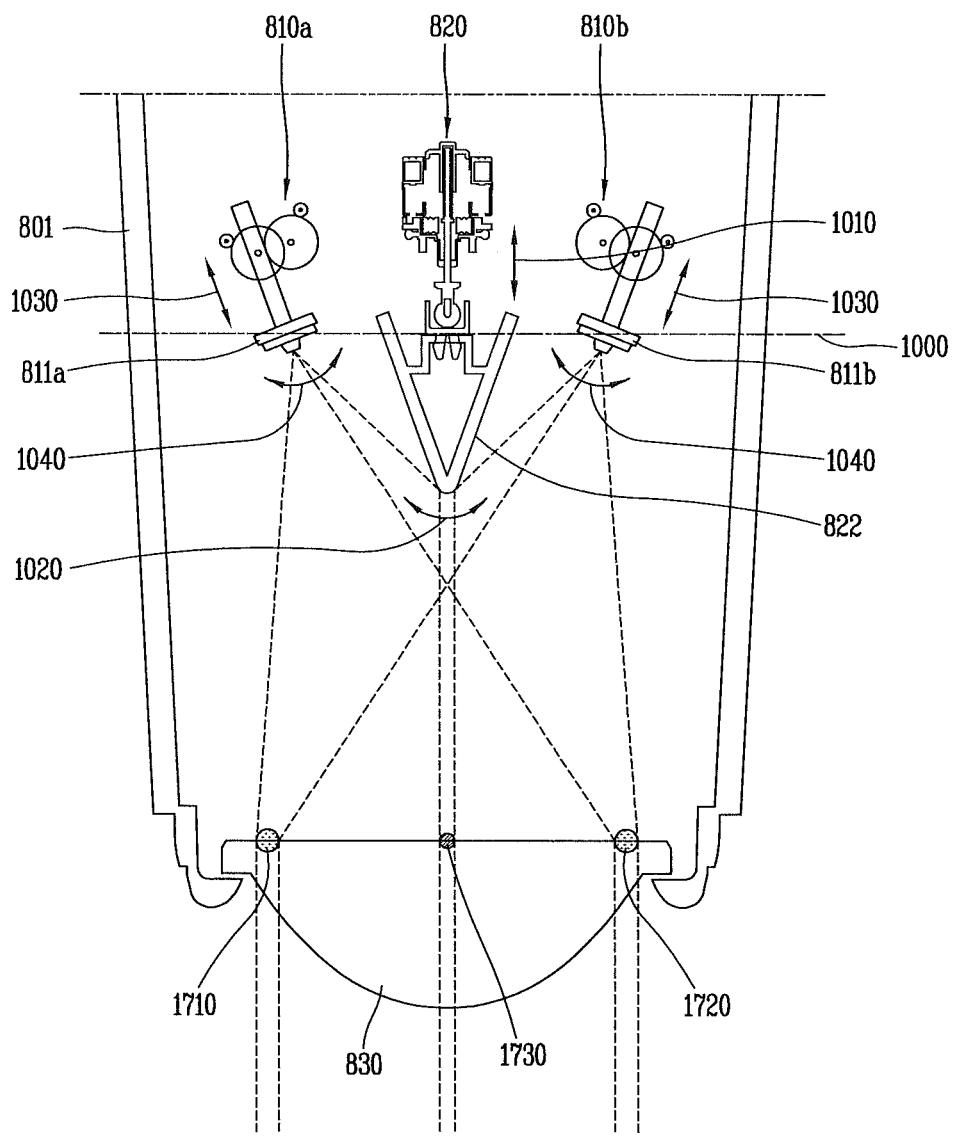
FIG. 10 is a diagram illustrating the example lamp of FIG. 9.

FIG. 10 illustrates the example lamp of FIG. 9. In particular, FIG. 10 illustrates a cross-sectional view of the example lamp of FIG. 9.

As aforementioned, the lamp 800 for the vehicle may include the at least two light modules 810a and 810b, and the reflection unit 820 disposed between the at least two light modules 810a and 810b.

The at least two light modules 810a and 810b may be provided with at least two light sources 811a and 811b.

The at least two light sources 811a and 811b may be provided in the light modules 810a and 810b, respectively. That is, the first light module 810a may include the first light source 811a, and the second light module 810b may include the second light source 811b. That is, the light source unit 810 of the lamp 800 for the vehicle may include the at least two light sources 811a and 811b.

The reflection unit 820 may include the reflector 822. The reflector 822 may be located between the at least two light sources 811a and 811b, and configured to reflect light emitted from the at least two light sources 810a and 810b. The light reflected by the reflector 822 may be incident to the third region 1730 of the lens 830.

The lens 830 may be arranged at the front side (in a light output direction) of the light source unit 810 (the light sources 811a and 811b) and the reflection unit 820 (the reflector 822).

Direct light which is emitted from each of the at least two light sources 811a and 811b of the lens 830 may be incident on the first region 1710 and the second region 1720, and reflected light which is emitted from each of the at least two light sources 811a and 811b and then reflected by the reflector 822 may be incident on the third region 1730, different from the first and second regions 1710 and 1720.

In some implementations, the lamp 800 can include multiple light sources, e.g., n (n is equal to or greater than 2) light sources, to generating multiple light spots, e.g., n+1 light spots (beam patterns, concentrated light incident regions).

In some implementations, the lamp 800 for the vehicle may vary at least one of the sizes and the center positions of the first and second regions 1710 and 1720 where the light emitted from each of the at least two light sources is incident directly on the lens, or vary at least one of the size and the center position of the third region 1730 where the light emitted from each of the at least two light sources is reflected by the reflector and then incident on the lens.

To this end, the reflector 822 may be arranged between the at least two light sources 811a and 811b along one direction 1000. Also, at least one of the reflector 822 and the at least two light sources 811a and 811b may be movable (linearly movable, rotatable) along another direction different from the one direction 1000.

In detail, the reflection unit 820 may be linearly movable (1010) based on one axis, or rotatable (1020) centering on one center point.

Also, the light source unit 810 may be configured such that each of the light sources 811a and 811b is linearly movable (1030) based on one axis or rotatable (1040) centering on one center point.

The reflector 822, as illustrated in FIG. 13, may include a plurality of reflective surfaces. The reflector 822 may be configured such that at least one of the plurality of reflective surfaces is rotatable (or inclined) based on one axis (or coupling axis) or one center point (or coupling point).

The processor 870, as aforementioned, may control the light source unit 810 and/or the reflection unit 820 to linearly move or rotate the light sources 811a and 811b and/or the reflector 822.

The processor 870, as aforementioned, may also control the reflection unit 820 to rotate (or incline) at least one of the plurality of reflective surfaces of the reflector 822.

As such, the processor 870 can change at least one of the sizes and the center positions of the first and second regions 1710 and 1720 where the direct light of each of the light sources is incident on the incident surface of the lens 830, or vary at least one of the size and the center position of the third region 1730 where the reflected light reflected by the reflector 822 is incident on the incident surface of the lens 830.

The lamp 800 for the vehicle may control the at least two light sources 811a and 811b and the reflector 822 in an independent manner. The processor 870 may control at least one of the light source unit 810 and the reflection unit 820 to vary the size and/or center position of at least one of the first to third regions 1710, 1720 and 1730.

The lamp 800 for the vehicle can be configured such that only at least one of the at least two light sources is rotatable or linearly movable, or configured such that all of the at least two light sources are rotatable or linearly movable.

Also, the processor 870 may rotate or linearly move only a part or all of the at least two light sources.

The lamp 800 for the vehicle may also be configured to linearly move/rotate only the reflector or only the light sources of the at least two light sources and the reflector.

Also, the light sources/reflector may also be configured to be merely linearly movable or merely rotatable.

Figure 11A:
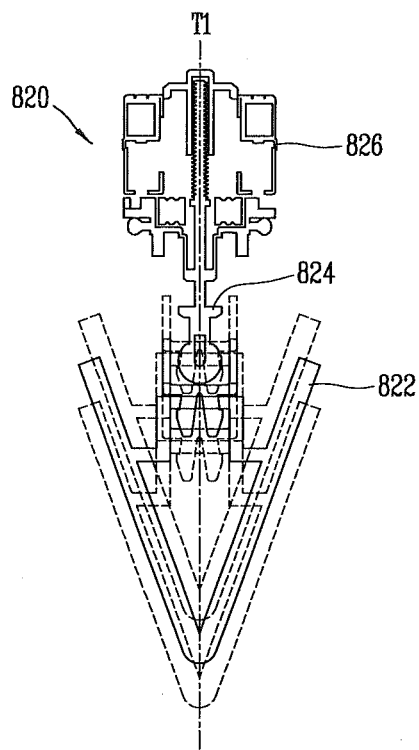
FIGS. 11(a) and 11(b) are diagrams illustrating example operations of a reflector.
Figure 11B:
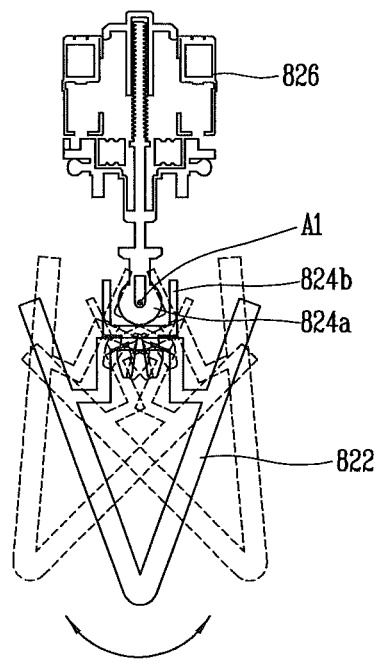

FIGS. 11(a) and 11(b) illustrate example operations of a reflector.

The reflection unit 820 may include the reflector 822, a pivot coupling portion 824 coupled to the reflector 822, and an actuator 826 coupled to the pivot coupling portion 824.

In detail, the reflection unit 820 may include the reflector 822 coupled to one side (e.g., a front side) of the pivot coupling portion 824, and the actuator 826 coupled to another side (e.g., a rear side) of the pivot coupling portion 826.

The pivot coupling portion 824 may include every member coupling the actuator 826 and the reflector 822. However, in some implementations, the reflection unit 820 may directly connect the reflector 822 and the actuator 826 to each other.

The actuator 826 may include every type of driving device for driving the pivot coupling portion 824 to which the reflector 822 is coupled. For example, the actuator 826 may include a motor, a piston, a cylinder and the like.

Referring to (a) of FIG. 11, the reflector 822 may be configured to be linearly movable along one axis T1 penetrating through the pivot coupling portion 824, in response to driving of the actuator 826.

For example, when the actuator 826 operates to linearly move the pivot coupling portion 824 forward/backward, the reflector 822 coupled to the pivot coupling portion 824 may be linearly movable forward/backward in response to the operation of the actuator 826.

The one axis T1 may refer to an axis formed corresponding to a lengthwise direction of the pivot coupling portion 824. Also, the one axis T1 may refer to the pivot coupling portion 824 itself or the lengthwise direction of the pivot coupling portion 824.

In some implementations, referring to (b) of FIG. 11, a ball joint 824a, 824b may be provided on one side of the pivot coupling portion 824 to be coupled to the reflector 822.

The ball joint 824a, 824b may include a first coupling portion 824a formed in a shape of a ball, and a second coupling portion 824b surrounding an outer circumferential surface of the first coupling portion 824a.

As illustrated in (b) of FIG. 11, the reflector 822 may be rotatable centering on the ball joint 824a, 824b.

In detail, the reflector 822 may be coupled to the ball joint 824a, 824b of the pivot coupling portion 824 and rotatable centering on one center point A1. In this example, the one center point A1 may refer to the ball joint or the first coupling portion 824a of the ball joint.

That is, the reflector 822 can be pivoted (rotated) centering on the one center point A1 (e.g., the ball joint of the pivot coupling portion or the first coupling portion 824a of the ball joint).

The reflection unit 820 may further include an additional driving portion for rotating (pivoting) the reflector 822 centering on the one center point A1. The additional driving portion may be arranged on the pivot coupling portion 824 or outside the pivot coupling portion 824 and the reflector 822.

With the configuration, the lamp 800 for the vehicle can vary at least one of the size and the center position of the third region of the lens to which light emitted from each of the at least two light sources and reflected by the reflector is incident.

FIGS. 12(a) to 12(d) illustrate example shapes of a reflector.

The reflector 822 may include a plurality of reflective surfaces. Also, the plurality of reflective surfaces may be coupled based on a center.

In this example, the center may include an axis (line) or a center point. When the plurality of reflective surfaces are two, the two reflective surfaces may be coupled to one axis. The one axis may refer to a portion where edges (sides) of the two reflective surfaces are coupled to each other by a predetermined angle. Also, the one axis may include a hinge coupling portion.

When the plurality of reflective surfaces are at least three, the at least three reflective surfaces may be coupled to one center point. In this example, the at least three reflective surfaces may be configured such that one vertex of each of the reflective surfaces is coupled to one another, and the coupled portion of the vertices may be the one center point.

As illustrated in FIG. 12, the lamp 800 for the vehicle may include various shapes of reflectors 822a, 822b, 822c and 822d.

For example, the reflector 822, as illustrated in (a) of FIG. 12, may have a shape 822a that two reflective surfaces are coupled to one axis.

As another example, the reflector 822, as illustrated in (b) and (d) of FIG. 12, may have shapes 822b and 822d that at least three reflective surfaces are coupled to one center point.

Figures 12A, 12B, 12C, 12D:
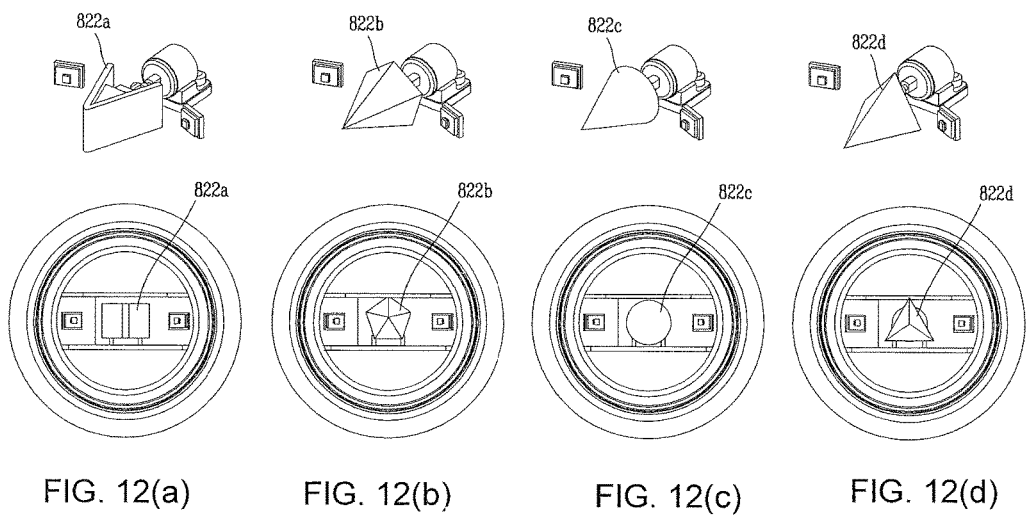
FIGS. 12(a) to 12(d) are diagrams illustrating example shapes of a reflector.

In some implementations, as illustrated in FIG. 12(c), the reflector 822 may include a conic shape 822c.

Referring to FIG. 18, when the shape of the reflector 822 varies, the third region 1730a, 1730b, 1730c and 1730d where light emitted from each of the at least two light sources and then reflected by the reflector 822 is incident on the lens may change. When the shape of the reflector 822 varies, at least one of a size and a center position of the third region as well as the shape may also change.

In some implementations, the lamp for the vehicle can include a plurality of reflective surfaces of the reflector that are controlled independently.

FIGS. 13(a) to 14(b) illustrate example operations of a reflector.

As aforementioned, the reflector 822 may be provided with a plurality of reflective surfaces 1300, which are coupled together based on a center.

In this example, the center may be one axis (or central axis) T2 on which the two reflective surfaces are coupled. For example, the one axis (or central axis) T2 may be a hinge coupling portion 1310 for coupling the plurality of reflective surfaces (e.g., two reflective surfaces 1300a and 1300b).

Also, the center may be one center point A2 on which vertices of at least three reflective surfaces are coupled when the plurality of reflective surfaces are at least three. The reflector 822 may include a supporting member supporting the connection of the vertices of the at least three reflective surfaces.

The plurality of reflective surfaces included in the reflector 822, which are in the coupled state to the center, may be arranged with being inclined by a predetermined angle θ1 based on one axis T1 penetrating the pivot coupling portion 824 (or an axis T1 corresponding to the pivot coupling portion 824 itself or a lengthwise direction of the pivot coupling portion 824).

The predetermined angle θ1 may be decided or vary according to the number of the plurality of reflective surfaces or by a user selection upon fabrication.

Figure 13A:
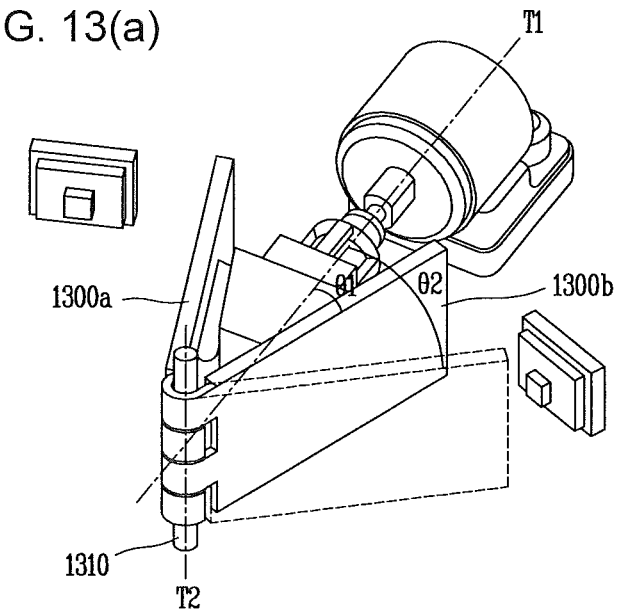
FIGS. 13(a) to 14(b) are diagrams illustrating example operations of a reflector.
Figure 13B:
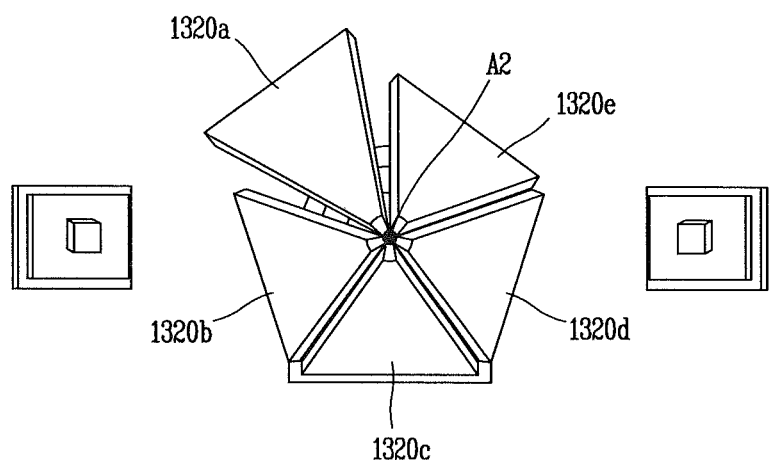

In some implementations, as illustrated in (a) and FIG. 13(b), a plurality of reflective surfaces 1300a, 1300b, 1320a, 1320b, 1320c, 1320d and 1320e of the reflector 822 may be independently rotatable (or inclinable) based on a center T2 or A2.

In this example, that the plurality of reflective surfaces are independently rotatable should be understood as including both of a case where the plurality of reflective surfaces are simultaneously rotated and a case where only some of the reflective surfaces are rotated.

Referring to FIG. 13(a), in an arranged state that an angle between each of the plurality of reflective surfaces 1300a and 1300b and one axis T1 penetrating through the pivot coupling portion 824 corresponds to the predetermined angle θ1, at least one of the plurality of reflective surfaces may be controlled by the processor 870 such that the angle can be changed to another angle θ2 different from the predetermined angle θ1.

That is, the processor 870 may control at least one of the plurality of reflective surfaces, which is arranged to have the predetermined angle θ1 from the one axis T1, such that the angle of the at least one reflective surface can change to the angle θ2 different from the predetermined angle θ1. In this example, the reflective surface can be inclined at an angle relative to the axis.

FIG. 13(a) illustrates a case where the reflector includes two reflective surfaces.

As illustrated in FIG. 13(a), the reflector 822 may include a plurality of reflective surfaces, which include a first reflective surface 1300a and a second reflective surface 1300b.

The first reflective surface 1300a and the second reflective surface 1300b may be coupled to the central axis T2. In this example, the central axis T2 may be one axis (or central axis) T2 to which edges of the two reflective surfaces are coupled. For example, the central axis T2 may be the hinge coupling portion 1310 for coupling the first and second reflective surfaces 1300a and 1300b.

The first reflective surface 1300a and the second reflective surface 1300b may be configured to be rotatable (pivoted) centering on the central axis T2, respectively.

In detail, the first and second reflective surfaces 1300a and 1300b may independently be rotatable. For example, the processor 870 may rotate (pivot) the first and second reflective surfaces 1300a and 1300b simultaneously centering on the central axis T2 or rotate only one of the first and second reflective surfaces 1300a and 1300b centering on the central axis T2.

In this example, rotating (or pivoting) the reflective surface may include a case of adjusting a rotated (pivoted) angle of the reflective surface based on the pivot coupling portion, or inclining the reflective surface based on the central axis T2.

To this end, the reflector 822 may be provided with an additional driving portion (not illustrated) for adjusting an angle of at least one of the plurality of reflective surfaces. For example, the additional driving portion may be provided on the hinge coupling portion 1310. The processor 870 may independently adjust the angle of the at least one of the plurality of reflective surfaces using the additional driving portion provided on the hinge coupling portion 1310.

FIG. 13(b) illustrates a case where the reflector 822 is provided with at least three reflective surfaces.

As illustrated in FIG. 13(b), the reflector 822 may include at least three reflective surfaces 1320a, 1320b, 1320c, 1320d and 1320e.

The at least three reflective surfaces 1320a, 1320b, 1320c, 1320d and 1320e may be coupled to the center point A2. Also, the center point A2 may be one point where vertices of the at least three reflective surfaces are joined together. The reflector 822 may include a supporting member configured to connect vertices of the at least three reflective surfaces to one point (center point A2).

Each of the at least three reflective surfaces 1320a, 1320b, 1320c, 1320d and 1320e may be configured such that an angle with the pivot coupling portion 824 can be adjusted.

FIG. 13(b) is a front view in case where the reflector includes at least three reflective surfaces. As illustrated in FIG. 13(b), the at least three reflective surfaces 1320a, 1320b, 1320c, 1320d and 1320e may be configured to be independently inclinable.

To this end, the reflector 822 may include an additional driving portion (not illustrated) for adjusting an angle of at least one of the plurality of reflective surfaces. For example, the additional driving portion may be provided on a supporting member A2. The processor 870 may independently adjust an angle of at least one of the plurality of reflective surfaces using the additional driving portion provided on the supporting member A2.

In some implementations, a plurality of reflective surfaces can rotate simultaneously. The lamp for the vehicle may adjust angles of the plurality of reflective surfaces using the aforementioned actuator 826, without any additional driving portion. In some other implementations, the plurality of reflective surfaces can rotate simultaneously with an additional driving portion.

Figure 14A:
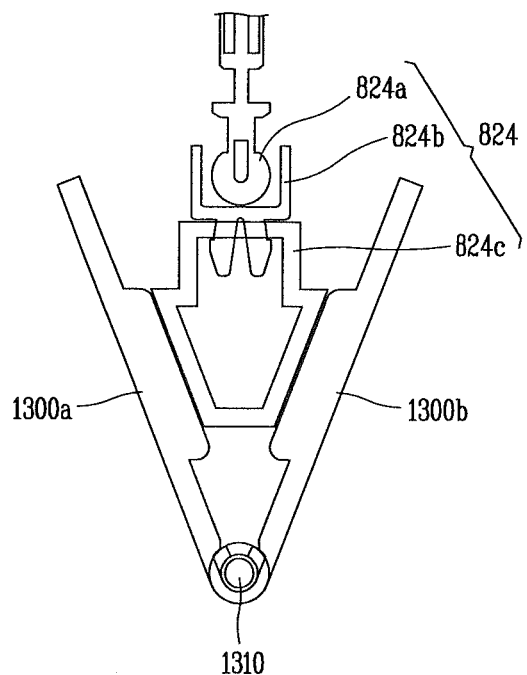
Figure 14B:
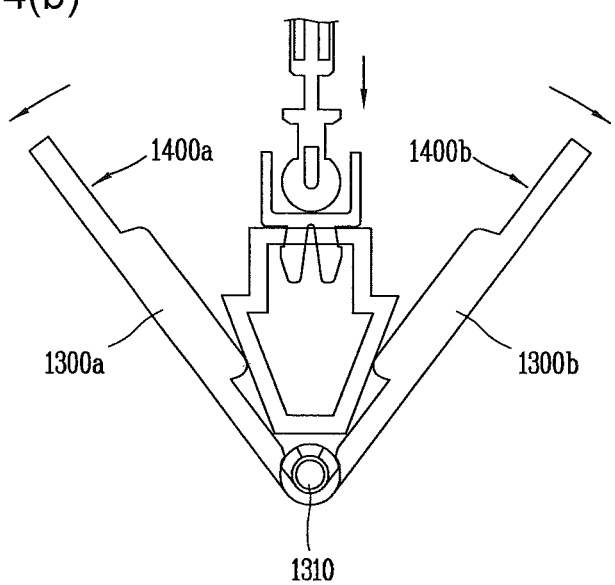

FIGS. 14(a) and 14(b) illustrate example operations of a reflector.

As illustrated in FIG. 14(a), the pivot coupling portion 824 included in the reflection unit 820 may include a first coupling portion 824a in a ball-like shape, a second coupling portion 824b surrounding an outer circumferential surface of the first coupling portion 824a, and a third coupling portion 824c coupled to the second coupling portion 824b and brought into contact with the plurality of reflective surfaces 1300a and 1300b.

The first coupling portion 824a and the second coupling portion 824b may be the aforementioned ball joint. The second coupling portion 824b may be configured to surround at least part of the outer circumferential surface of the first coupling portion 824a, and serve to connect the first coupling portion 824a to the third coupling portion 824c.

The third coupling portion 824c may be brought into contact with at least some (1400a, 1400b, or inner surfaces) of the plurality of reflective surfaces, which face the pivot coupling portion 824.

The first to third coupling portion 824a, 824b and 824c may be linearly movable by driving the actuator 826. This is because the first to third coupling portions 824a, 824b and 824c are included in the pivot coupling portion 824 and the pivot coupling portion 824 is linearly moved by driving the actuator 826.

Referring to FIG. 14(b), the plurality of reflective surfaces 1300a and 1300b may be configured such that an angle with the pivot coupling portion 824 is varied in response to the linear movement of the first to third coupling portions 824a, 824b and 824c by the actuator 826.

To this end, a center (e.g., a central axis, a center point, the hinge coupling portion 1310) to which edges (or vertices) of the plurality of reflective surfaces 1300a and 1300b are coupled may be fixed. Accordingly, when the first to third coupling portions 824a, 824b and 824c are moved forward by the actuator 826, as illustrated in (b) of FIG. 14, the first to third coupling portions 824a, 824b and 824c may be linearly moved close to the center (e.g., the hinge coupling portion 1310).

The plurality of reflective surfaces 1300a and 1300b are rotated by the fixed hinge coupling portion 1310 and the linearly-moved third coupling portion 824c. In detail, as the third coupling portion 824c is moved toward the fixed hinge coupling portion 1310, the third coupling portion 824c pushes the plurality of reflective surfaces 1300a and 1300b. Accordingly, the plurality of reflective surfaces 1300a and 1300b may be open (unfold) based on the hinge coupling portion 1310. That is, the angles between the plurality of reflective surfaces 1300a and 1300b and the pivot coupling portion 824 may change (increase).

In some implementations, the reflector 822 may further be provided with an elastic member (not illustrated) for folding (closing, restoring to original states) the open (unfolded) plurality of reflective surfaces 1300a and 1300b.

The elastic member may also be mutually coupled to surfaces 1400a and 1400b (or inner surfaces) of the plurality of reflective surfaces 1300a and 1300b, which face the pivot coupling portion 824, and also coupled to each of the plurality of reflective surfaces 1300a and 1300b provided in the hinge coupling portion 1310.

The processor 870 may control the actuator 826 to linearly move the pivot coupling portion 824 to the front such that the plurality of reflective surfaces 1300a and 1300b of the reflector 822 can simultaneously rotate (e.g., be open (unfolded) or increase the angles formed with the pivot coupling portion).

Afterwards, the processor 870 may control the actuator 826 to linearly move the pivot coupling portion 824 to the rear such that the plurality of reflective surfaces 1300a and 1300b of the reflector 822 can simultaneously rotate (e.g., folded or decrease the angles formed with the pivot coupling portion). When the pivot coupling portion 824 is linearly moved to the rear, the plurality of reflective surfaces 1300*a* and 1300*b* may rotate toward the pivot coupling portion 824 by the elastic member.

The elastic member may be selectively provided when an additional driving portion is provided on the center. That is, when the additional driving portion (a component for independently rotating the reflective surfaces) is provided on the center, the elastic member may be provided or not provided.

In some implementations, the lamp for the vehicle may include a holding member (not illustrated) for fixing/non-fixing the center (e.g., the central axis T2, the center point A2, the hinge coupling portion 1310). The holding member (not illustrated) may be coupled to the center, and thus fix or not fix the center by the control of the processor 870.

For example, the processor 870 may control the holding member not to fix the center (e.g., the central axis T2, the center point A2, the hinge coupling portion 1310) when desiring to linearly move the reflector 822 itself to front/rear.

As another example, the processor 870 may control the holding member to fix the center (e.g., the central axis T2, the center point A2, the hinge coupling portion 1310) when desiring to simultaneously rotate the plurality of reflective surfaces of the reflector 822.

When at least one of the plurality of reflective surfaces of the reflector 822 is rotated, at least one of the size and the center position of the third region at which light emitted from each of the at least two light sources and then reflected by the plurality of reflective surfaces is incident to the lens can vary.

For example, when the plurality of reflective surfaces of the reflector 822 are simultaneously rotated, the size of the third region at which the light emitted from each of the at least two light sources and then reflected by the plurality of reflective surfaces is incident to the lens can change.

As another example, when only part of the plurality of reflective surfaces of the reflector 822 is rotated, at least one of the size and the center position of the third region at which the light emitted from each of the at least two light sources and then reflected by the plurality of reflective surfaces is incident to the lens can change.

In some implementations, the lamp for a vehicle can control a size and a center position of an area to which reflected light is incident such that the lamp can output light on a region to which an additional beam pattern is emitted by the ADAS.

In some implementations, the lamp for a vehicle can change sizes and center positions of first and second regions as well as change a size and a center position of a third region.

Figure 15B:
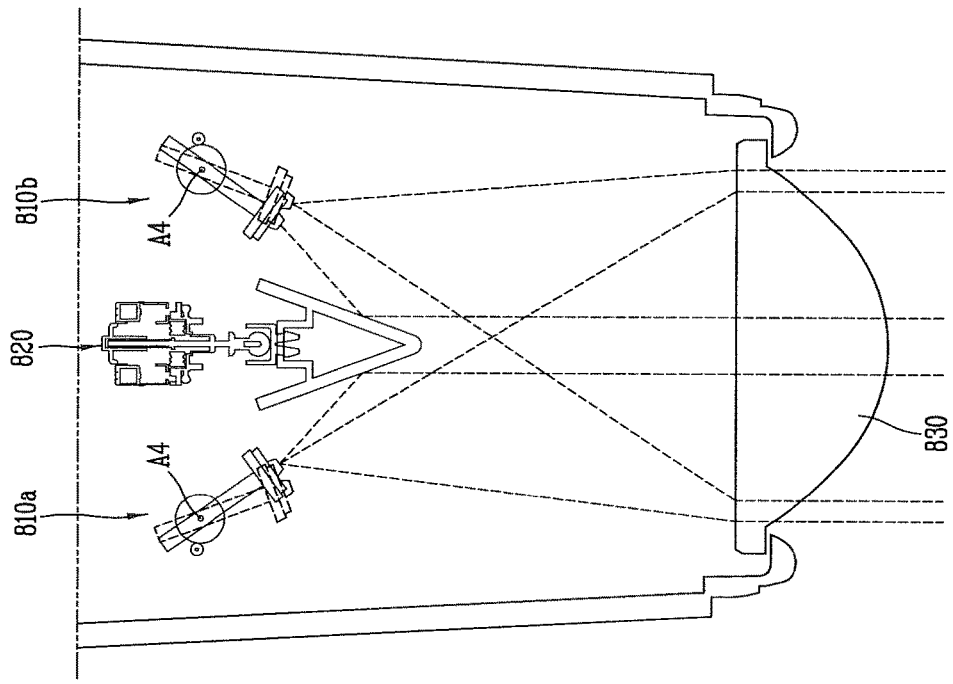
FIGS. 15(a) to 16(b) are diagrams illustrating example operations of a light source unit.
Figure 15A:
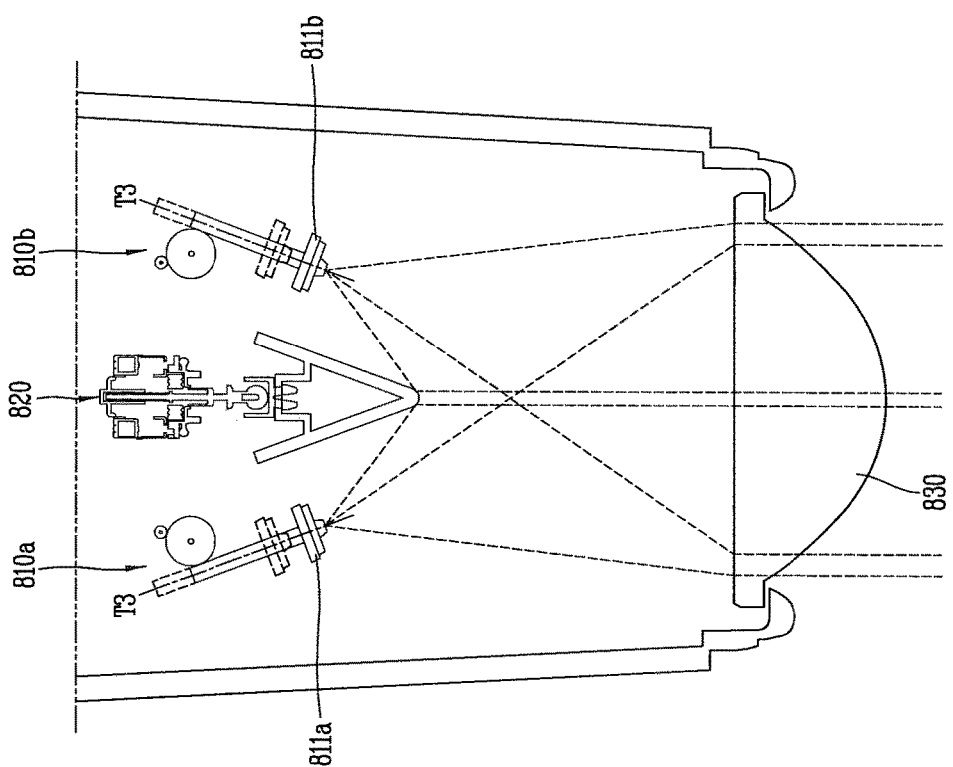

FIGS. 15(*a*) to 16(*b*) illustrate example operations of a light source unit.

As illustrated in FIG. 15, the light source unit 810 may include the at least two light modules 810*a* and 810*b*. The light modules 810*a* and 810*b* may be provided with the light sources 811*a* and 811*b*, respectively.

The light source unit 810 (light modules 810*a* and 810*b*), as illustrated in (a) of FIG. 15, may be configured such that the light sources 811*a* and 811*b* are linearly movable based on one axis T3.

Also, the light source unit 810 (light modules 810*a* and 810*b*), as illustrated in (b) of FIG. 15, may be configured such that the light sources 811*a* and 811*b* can rotate centering on one center point A4.

Figure 16A:
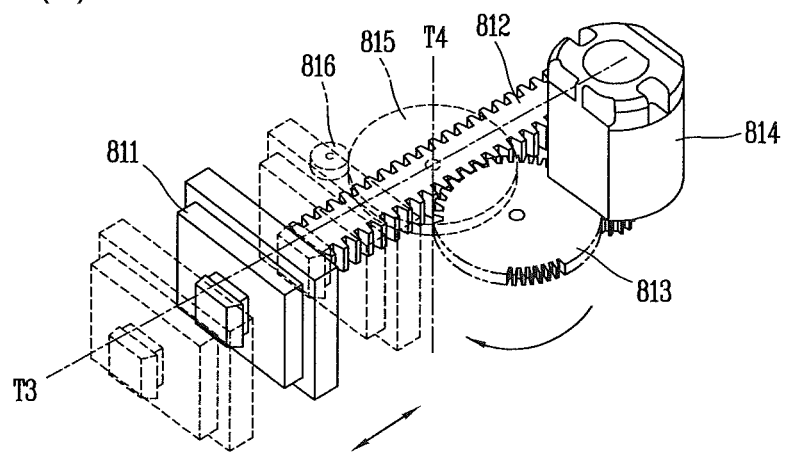
Figure 16B:
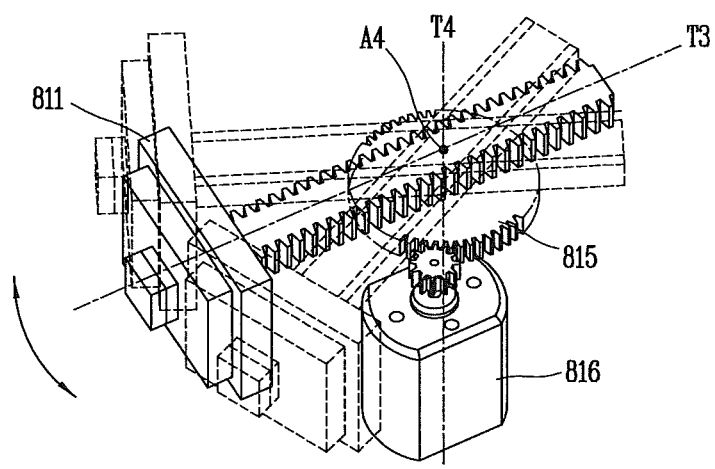

As illustrated in FIG. 16(*a*), the light source unit 810 light modules 810*a* and 810*b*) may include a linear gear 812 coupled to the light source 811, and a first driving portion 813, 814 that are coupled to the linear gears 812 to linearly move the linear gear 812.

In detail, the linear gear 812 may be provided with a gear formed on at least one of a plurality of surfaces of a linear bar. In some implementations, as illustrated in FIG. 16(*a*), the linear gear 812 is provided with gears formed on left and right surfaces of the plurality of surfaces. In some other implementations, the linear gear 812 may be provided with a gear formed on at least one of an upper surface, a lower surface, a left surface, or a right surface.

The linear gear 812 may also be referred to as teeth or a teeth portion.

Also, the first driving portion 813, 814 may be configured to linearly move the linear gear 812 (e.g., to linearly move the linear gear 812 back and forth, in a lengthwise direction of the linear gear, or based on one axis T3 penetrating through the linear gear in the lengthwise direction).

For example, as illustrated in FIG. 16(*a*), the first driving portion may include a gear 813 brought into contact with the linear gear 812, and a first actuator 814 brought into contact with the gear 813 to rotate the gear 813.

For example, the gear 813 may be formed in a shape of a circulate plate (or a cylindrical shape), and engaged with the gear of the linear gear 812.

The first actuator 814 may be coupled to a part of the gear 813 to rotate the gear 813 centering on a center of the gear 813.

For example, the first actuator 814 may be coupled to a part of the gear 813, which is spaced apart from a contact portion between the gear 813 and the linear gear 812.

The linear gear 812 may be linearly movable in response to a rotation of the gear 813.

In detail, when the first actuator 814 is driven, the gear 813 is rotated. When the gear 813 is rotated, the linear gear 812 may be linearly moved to the front or rear side. A linearly-moving direction of the linear gear 812 is decided based on a rotating direction of the gear 813.

In some implementations, FIG. 16(*a*) illustrates that the linear gear 812 is brought into contact with the gear 813. However, In some other implementations, the first actuator 814 can be brought into contact directly with the linear gear 812 coupled with the light source 811. In this instance, the linear gear 812 may be linearly moved to the front or rear side (or linearly moved in a lengthwise direction of the linear gear or based on one axis penetrating through the linear gear in the lengthwise direction), in response to the operation of the first actuator 814.

The processor 870 may control the first actuator 814 to linearly move the linear gear 812 attached on the light source 811 such that the linear source 811 can be linearly moved.

In some implementations, as illustrated in FIG. 16(*b*), the light source unit 810 (or light modules 810*a* and 810*b*) may include a linear gear 812 coupled to the light source 811, and a second driving portion 815, 816 for rotating the linear gear 812 based on an axis T4 penetrating through one point A4 (or one axis) of the linear gear 812.

For example, as illustrated in FIG. 16(*b*), the second driving unit may include a circular plate 815 fixedly coupled to the one point A4 of the linear gear 812, and a second actuator 816 for rotating the circular plate 815.

As another example, the circular plate 815 may be formed in a circular shape (or cylindrical shape), and fixed to a surface of the linear gear 812 without a gear. As another example, when the gears of the linear gear 812 are provided on left and right surfaces, the disk plate 815 may be fixed to one point included in at least one of an upper surface or a lower surface of the linear gear 812.

The second actuator 816 may be coupled to a part of the circular plate 815 to rotate the circular plate 815 centering on a center of the circular plate 815.

In this instance, the center of the circular plate 815 may be coupled to a position corresponding to the one point A4 of the linear gear 812.

For example, the second actuator 816 may be coupled to a side surface of the circular plate 815 such that the circular plate 815 can rotate centering on an axis penetrating through the center of the circular plate 815.

As illustrated in FIG. 16(*b*), the light source 811 may rotate centering on the axis T4 penetrating through the one point A4 of the linear gear, in response to the rotation of the circular plate 815.

In detail, when the second actuator 816 is driven, the circular plate 815 is rotated centering on the center of the circular plate. When the circular plate 815 is rotated, the center of the circular plate 815 and the one point A4 of the linear gear 812 are coupled to each other at a position perpendicularly corresponding to each other. Therefore, the linear gear 812 can rotate centering on the axis T4 perpendicularly penetrating through the one point A4.

Accordingly, the light source 811 coupled to a position spaced apart from the one point A4 of the linear gear 812 can rotate centering on the axis T4 in the state of being spaced apart from the axis T4 by a predetermined distance.

The rotating direction of the light source 811 may correspond to the rotating direction of the circular plate 815.

In some implementations, FIG. 16(*b*) illustrates that the circular plate 815 is fixed to the linear gear 812. However, In some other implementations, the second actuator 816 is brought into contact directly with the linear gear 812 coupled with the light source 811. In this instance, the linear gear 812 may rotate, in response to the operation of the second actuator 816, and accordingly the light source 811 provided on one side of the linear gear 812 can rotate with being spaced apart from one point where the second actuator 816 is coupled to the linear gear 812 by a predetermined distance.

The processor 870 may control the second actuator 816 to rotate the linear gear 812 attached on the light source 811 such that the light source 811 can rotate.

In some implementations, the first driving portion and the second driving portion may be coupled simultaneously to the linear gear 812. Accordingly, when the linear gear 812 is linearly moved by the first driving portion, the second driving portion is also subject to the linear movement.

Also, when the linear gear 812 is rotated by the second driving portion, the gear 813 (or the first actuator 814) included in the first driving portion can rotate dependently.

The processor 870 included in the lamp 800 for the vehicle can linearly move or rotate the light source 811 included in the light source unit 810 and/or the reflector 822 included in the reflection unit 820, on the basis of the structures of the light source unit 810 and the reflection unit 820.

Also, the processor 870 included in the lamp 800 for the vehicle can rotate or incline the plurality of reflective surfaces of the reflector 822 based on a center (central axis, center point, hinge coupling portion, etc.), using the structure of the reflector 822.

FIGS. 17 to 27 illustrate example operations of a reflector and a light source to change beam patterns.

Figure 17:
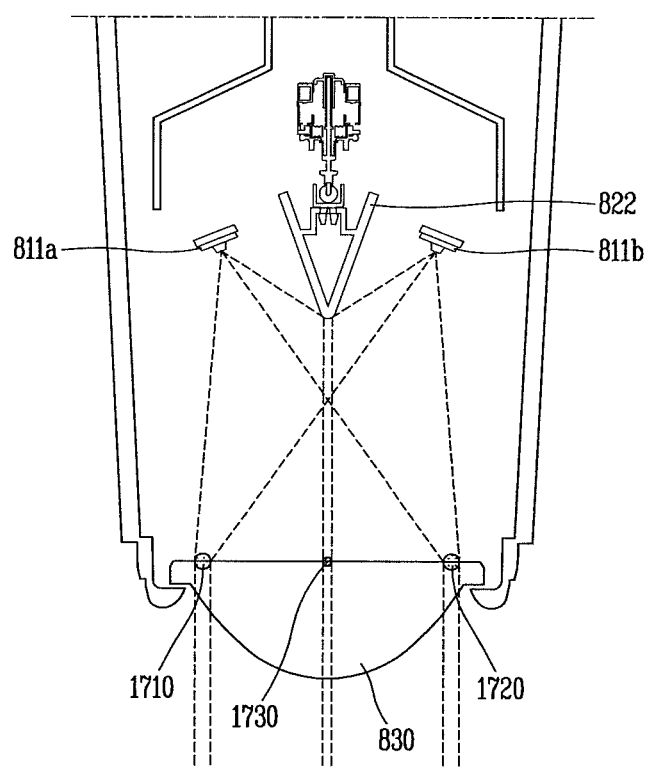

Referring to FIG. 17, the lens 830 may include the first region 1710 and the second region 1720 to which light emitted from the at least two light sources 811a and 811b is directly incident. Also, the lens 830 may include a third region 1730 to which reflected light emitted from the at least two light sources 811a and 811b and then reflected by the reflector 822 is incident.

As illustrated in FIG. 18, the third region 1730 may have various shapes 1730a, 1730b, 1730c and 1730d based on a shape of the reflector 822.

When the reflector 822 has a first shape, the third region 1730 may have a shape 1730a corresponding to the first shape.

Also, when the reflector 822 has a second shape different from the first shape, the third region 1730 may have a shape 1730b corresponding to the second shape.

in some implementations, center positions and/or sizes of the first region 1710 and the second region 1720 can be changed based on a rotation or linear movement of at least one of the at least two light sources.

Figure 19:
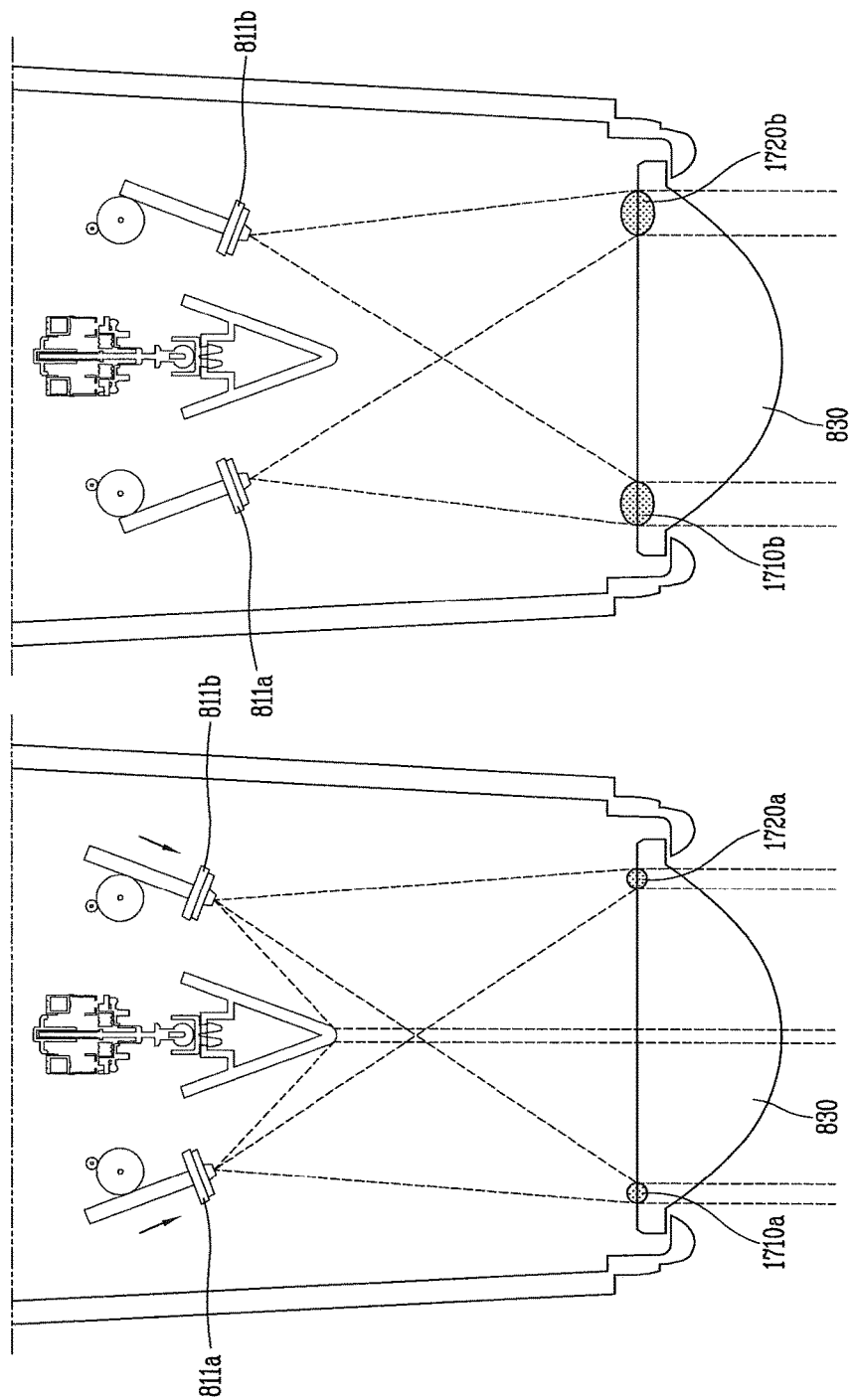

For example, as illustrated in FIG. 19, when the at least two light sources 811a and 811b are linearly moved, the first region 1710a and the second region 1720a both having a first size may change into a first region 1710b and a second region 1720b both having a second size different from the first size.

For example, when the at least two light sources 811a and 811b are linearly moved forward (e.g., toward the lens), as illustrated in FIG. 19, the sizes of the first region and the second region may increase. Also, responsive to the linear movement, the center positions of the first region and the second region may also change. In this instance, the center positions may be moved toward the center of the lens 830.

As another example, when the at least two light sources 811a and 811b are linearly moved backward, the sizes of the first region and the second region may decrease and the center positions of the first region and the second region may be moved away from the lens 830.

Although not illustrated, when the at least two light sources 811a and 811b are rotated centering on one axis T4, the sizes and the center positions of the first region and the second region may change.

For example, when at least one of the at least two light sources 811a and 811b is rotated toward the reflector 822 centering on the one axis T4, the sizes of the first and second regions may be reduced.

That is, the processor 870 may control the light source unit 810 to linearly move or rotate at least one of the at least two light sources 811a and 811b, in order to change at least one of the size and the center position of the first region 1710 and/or the second region 1720.

In some implementations, the center position or size of the third region 1730 at which light emitted from each of the at least two light sources and reflected by the reflector 822 is incident to the lens 830 can change when the reflector 830 is rotated or linearly moved, when the at least two light sources 811a and 811b are rotated or linearly moved, or when an inclination of at least one of the plurality of reflective surfaces of the reflector 822 changes.

To this end, the processor 870 may control the light source unit 810 to rotate the at least two light sources 811a and 811b centering on the axis T4 penetrating through the one point A4 or to linearly move the linear gear 812 based on the axis T3 (or optical axis or an axis perpendicularly penetrating through the light source 811), in order to change the size or center position of the third region 1730.

Also, the processor 870 may control the reflection unit 820 to linearly move the reflector 822 based on one axis T1 or rotate the reflector 822 centering on one center point A1, or to incline (or rotate) at least one of the plurality of reflective surfaces of the reflector 822 based on a center (central axis T2 or the center point A2), in order to change the size or center position of the third region 1730.

For example, the size of the third region may increase as the reflector 822 is linearly moved more toward the lens. On the other hand, the size of the third region may be reduced as the reflector 822 is linearly moved more opposite to the lens.

As illustrated in FIG. 20(*a*), the size of the third region may be a first size 2000*a*. The processor 870, as illustrated in FIG. 20(*b*), may control the actuator 826 of the reflection unit 820 to move the reflector 822 toward the lens 830 (to the front side), in order to increase the size of the third region. In this instance, the size of the third region may change into a second size 2000*b* greater than the first size 2000*a*.

On the contrary, the processor 870, as illustrated in FIG. 20(*c*), may control the actuator 826 of the reflection unit 820 to linearly move the reflector 822 away from the lens 830 (or to the rear side), in order to reduce the size of the third region. In this instance, the size of the third region may change into a third size 2000*c* smaller than the first size 2000*a*.

As another example, the size of the third region may be reduced as the at least two light sources 811*a* and 811*b* are linearly moved toward the lens 830. On the contrary, the size of the third region may increase more as the at least two light sources 811*a* and 811*b* are linearly moved away from the lens.

As illustrated in FIG. 21(*a*), the size of the third region may be a first size 2100*a*. The processor 870, as illustrated in FIGS. 21(*b*) and 21(*c*), may control the light source unit 810 (or the light modules 810*a* and 810*b*) to linearly move the at least two light sources 811*a* and 811*b* toward the lens 830, in order to reduce the size of the third region. The size of the third region may gradually be reduced (2100*b*, 2100*c*) as the at least two light sources are linearly moved toward the lens.

On the other hand, in order to increase the size of the third region, the processor 870 may control the light source unit 810 (or light modules 810*a* and 810*b*) to linearly move the at least two light sources 811*a* and 811*b* away from the lens. The size of the third region may gradually increase as the at least two light sources are linearly moved away from the lens.

In some implementations, the size of the third region may increase as the at least two light sources 811*a* and 811*b* are rotated toward the reflector 822. In detail, the size of the third region may increase as the at least two light sources are rotated toward the reflector 822 centering on one axis T4. On the contrary, the size of the third region can be reduced when the at least two light sources are rotated away from the reflector 822 centering on the one axis T4.

Figure 22A:
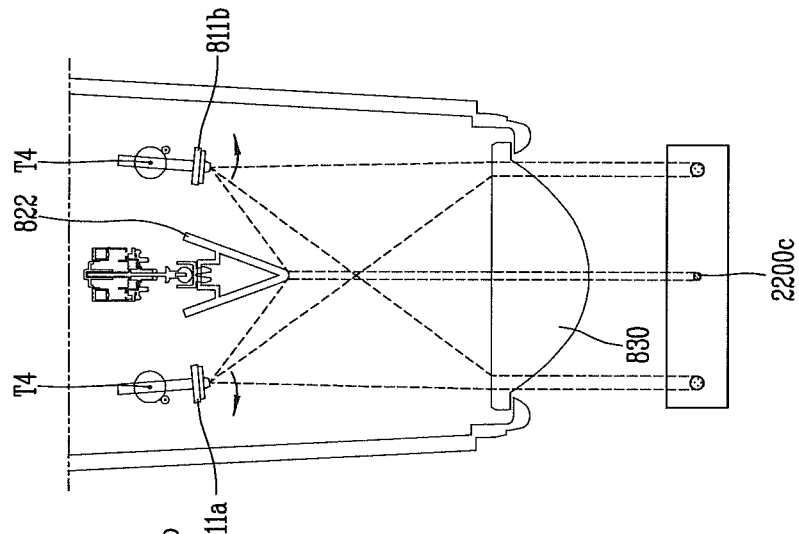
Figure 22B:
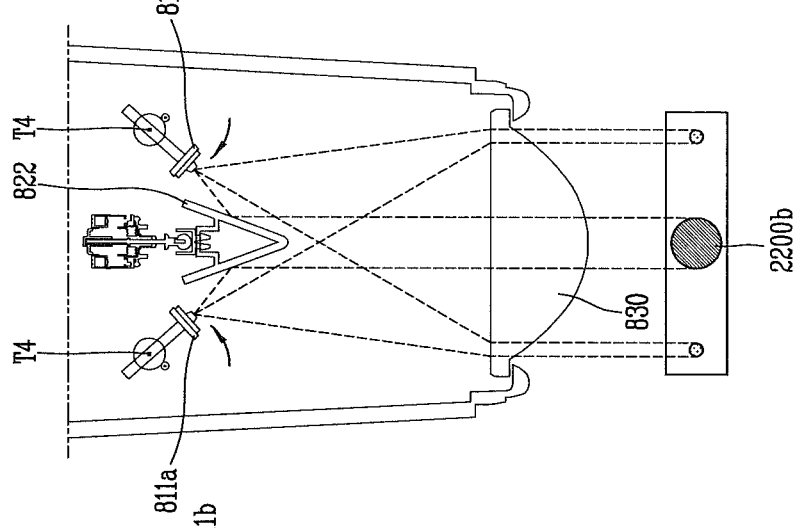
Figure 22C:
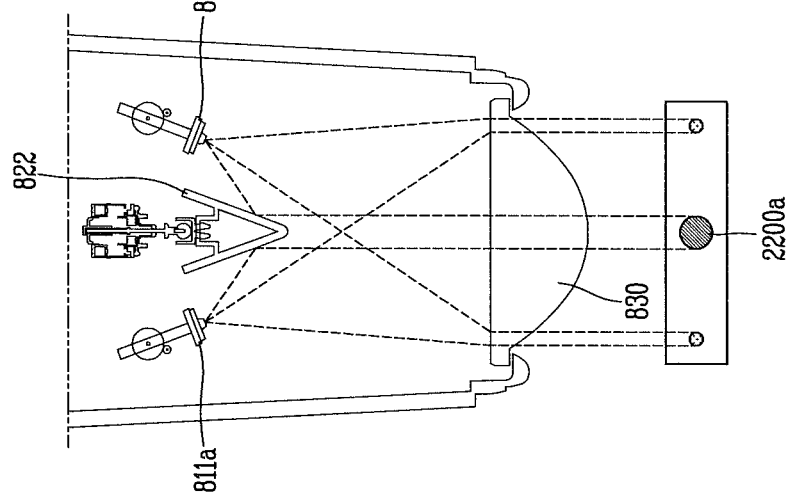

Referring to FIG. 22(*a*), the size of the third region may be a first size 2200*a*. In order to increase the size of the third region, the processor 870, as illustrated in FIG. 22(*b*), the processor 870 may control the light source unit 810 (or the light modules 810*a* and 810*b*) to rotate the at least two light sources 811*a* and 811*b* to rotate toward the reflector 822 centering on the one axis T4. In this instance, the third region may have a second size 2200*b* greater than the first size 2200*a*.

On the contrary, in order to reduce the size of the third region, the processor 870, as illustrated in FIG. 22(*c*), may control the light source unit 810 (or light modules 810*a* and 810*b*) to rotate the at least two light sources 811*a* and 811*b* away from the reflector 822 centering on the one axis T4. In this instance, the third region may have a third size 2200*c* smaller than the first size 2200*a*.

In some implementations, the size of the third region may increase as a plurality of reflective surfaces 1300*a* and 1300*b* of the reflector 822 are inclined (or rotated) toward the lens 830. On the other hand, the size of the third region may be reduced as the plurality of reflective surfaces 1300*a* and 1300*b* of the reflector 822 are inclined (or rotated) away from the lens 830.

In detail, the third region may have a first size 2300*a*. In this state, to increase the size of the third region, the processor 870 may control the reflection unit 820 such that at least part of the plurality of reflective surfaces 1300*a* can be inclined toward the lens based on a center (e.g., the central axis T2, the center point A2 or the hinge coupling portion 1310).

In this instance, as illustrated in FIGS. 23(*b*) and 23(*c*), the third region may have a second size 2300*b* or a third size 2300*c* greater than the first size 2300*a*. In this instance, the size of the third region may increase as the number of the reflective surfaces inclined toward the lens increases, and also increase as an inclined degree thereof toward the lens increases. That is, as illustrated in FIGS. 23(*b*) and 23(*c*), the size 2300*b* of the third region when more reflective surfaces are inclined toward the lens may be greater than the size 2300*c*.

In some implementations, the center position of the third region may be moved, in response to a part of the plurality of reflective surfaces 1300*a* and 1300*b* of the reflector 822 being inclined.

For example, as illustrated in FIG. 23(*b*), when the plurality of reflective surfaces 1300*a* and 1300*b* of the reflector 822 are inclined toward the lens 830 simultaneously by the same inclination, the center position c of the third region may be maintained.

On the contrary, as illustrated in FIG. 23(*c*), when only a part (e.g., 1300*b*) of the plurality of reflective surfaces 1300*a* and 1300*b* of the reflector 822 is inclined toward the lens 830, the center position of the third region may be changed (moved) to a center position c'.

In this instance, a direction of being changed to the center position c' is changed may be decided based on a position of the inclined reflective surface.

For example, when only the left reflective surface 1300*b* of the plurality of reflective surfaces 1300*a* and 1300*b* is inclined, the center position c' of the third region may be moved in a left direction.

Figure 24A:
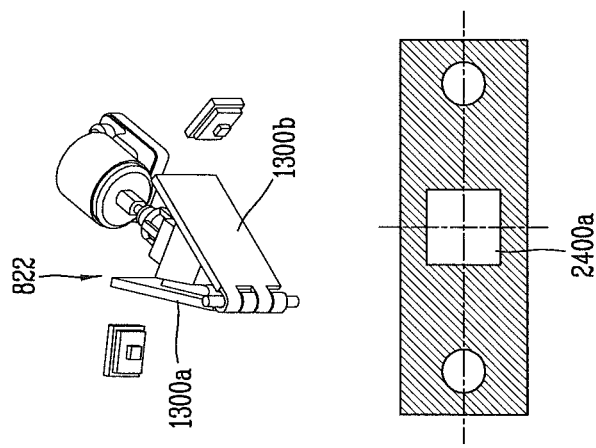
Figure 24B:
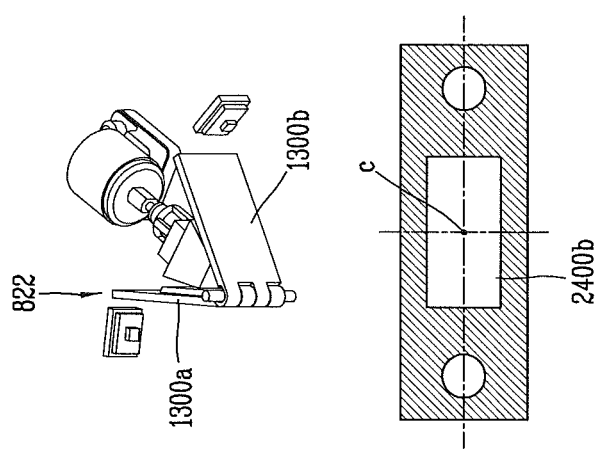

In more detail, as illustrated in FIG. 24(*a*), the third region may be formed to have a first size 2400*a* at a center position.

In this instance, the processor 870 may control the actuator 826 (or an additional driving portion provided on a center) of the reflection unit 820 such that the plurality of reflective surfaces 1300*a* and 1300*b* of the reflector 822 are simultaneously inclined toward the lens (or angles between the plurality of reflective surfaces and the pivot coupling portion 824 increases or the plurality of reflective surfaces 1300*a* and 1300*b* are rotated toward the lens centering on a center (e.g., central axis T2, center point A2 or the hinge coupling portion 1310).

In this instance, as illustrated in FIG. 24(*b*), in the state that the center position c of the third region is maintained, the size of the third region may increase (i.e., may change into a second size 2400*b* greater than the first size 2400*a*).

In some implementations, as illustrated in FIG. 24(*c*), the processor 870 may control an additional driving portion of the reflection portion 820 such that only a part (e.g., 1300*b*)

of the plurality of reflective surfaces 1300a and 1300b of the reflector 822 is inclined toward the lens.

Figure 24C:
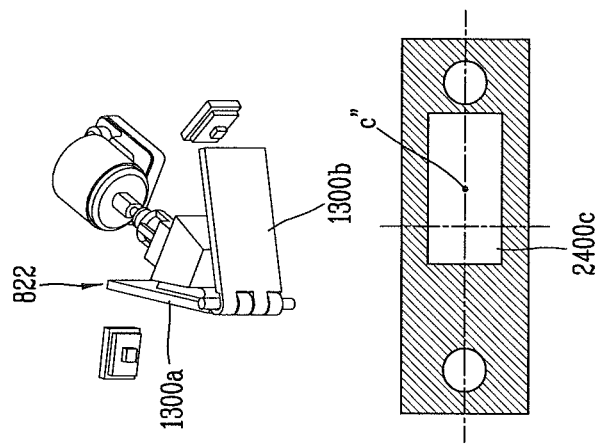

In this instance, as illustrated in FIG. 24(c), the size of the third region may change to a third size 2400c greater than the first size 2400a, and the center position of the third region may also change to a center position c". For example, the center position c" may be moved in a direction corresponding to a position of the part 1300b of the plurality of reflective surfaces inclined toward the lens (e.g., in a left direction for a left reflective surface).

The aforementioned description may be equally/similarly applied even to a case where the plurality of reflective surfaces are provided by at least three.

Figure 25C:
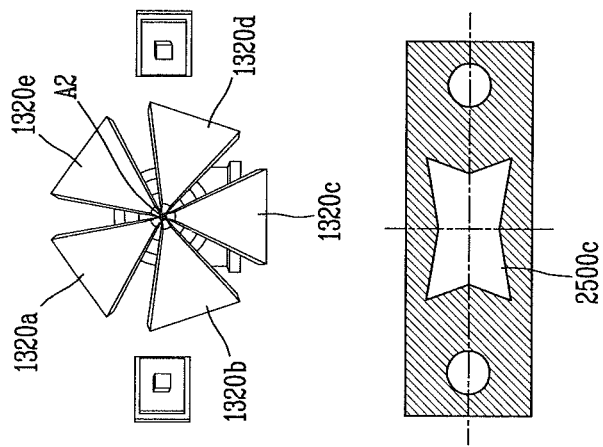
Figure 25B:
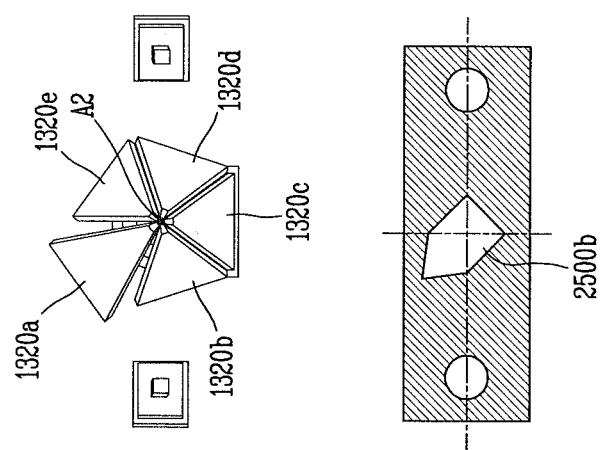
Figure 25A:
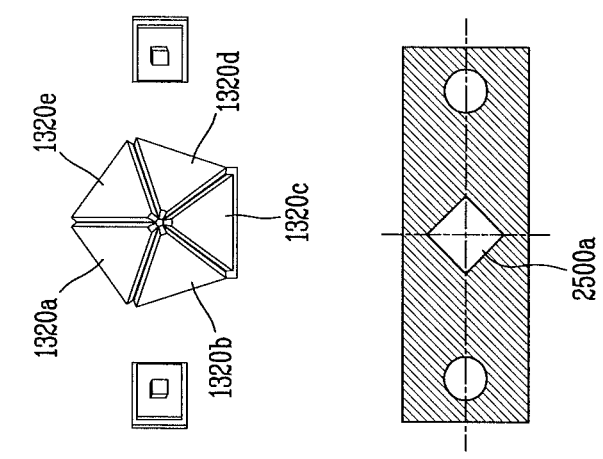

For example, as illustrated in FIG. 25(a), the reflector having at least three reflective surfaces 1320a, 1320b, 1320c, 1320d and 1320e may allow reflected light to be incident to the lens through the third region having a first shape 2500a located at a central portion.

In this instance, in order for the third region to have a second shape 2500b different from the first shape 2500a, the processor 870 may incline only a part (e.g., 1320a) of the at least three reflective surfaces toward the lens (or, rotate the part of the at least three reflective surfaces toward the lens centering on the center point A2, or incline the part of the at least three reflective surfaces to increase an angle formed with the pivot coupling portion based on the center point A2).

In this instance, as illustrated in FIG. 25(b), the third region may have the second shape 2500b different from the first shape 2500a, and the second shape 2500b may be greater than the first shape 2500a.

Also, the center position (a position of a center of gravity) of the third region may be moved, and be moved in a direction corresponding to a position of the inclined reflective surface.

Also, as illustrated in FIG. 25(c), when the at least three reflective surfaces are simultaneously inclined toward the lens by the same angle, the shape of the third region may change into a third shape 2500c different from the first and second shapes 2500a and 2500b. In this example, the third shape 2500c may be greater than the first and second shapes 2500a and 2500b. Accordingly, the center position of the third region having the third shape 2500c may be maintained at a central portion.

In some implementations, the center position of the third region may be moved in a direction corresponding to one direction when the reflector 822 is rotated in the one direction centering on one center point A1 (e.g., the first coupling portion 824a of the pivot coupling portion 824 or a ball joint).

Figure 26:
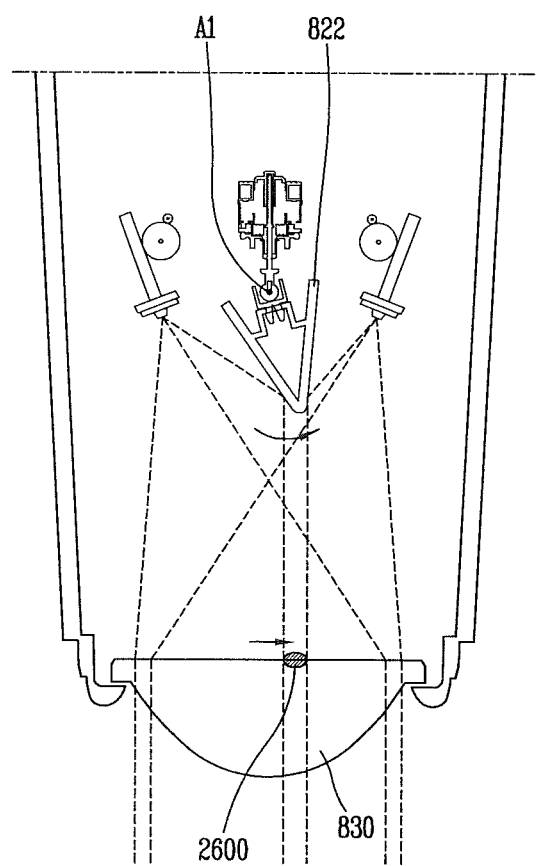

For example, as illustrated in FIG. 26, when the reflector 822 is rotated in a left direction centering on the one center point A1, the center position of the third region 2600 may be moved in the left direction.

To this end, the processor 870 may control the reflection unit 820 (or additional driving portion) such that the reflector 822 can rotate in the one direction centering on the one center point A1, so as to move the center position of the third region in the one direction.

In this instance, the size of the third region may change in response to the rotation of the reflector 822.

In some implementations, the center position of the third region may be moved in response to the linear movement or rotation of a part of the at least two light sources 811a and 811b.

Figure 27:
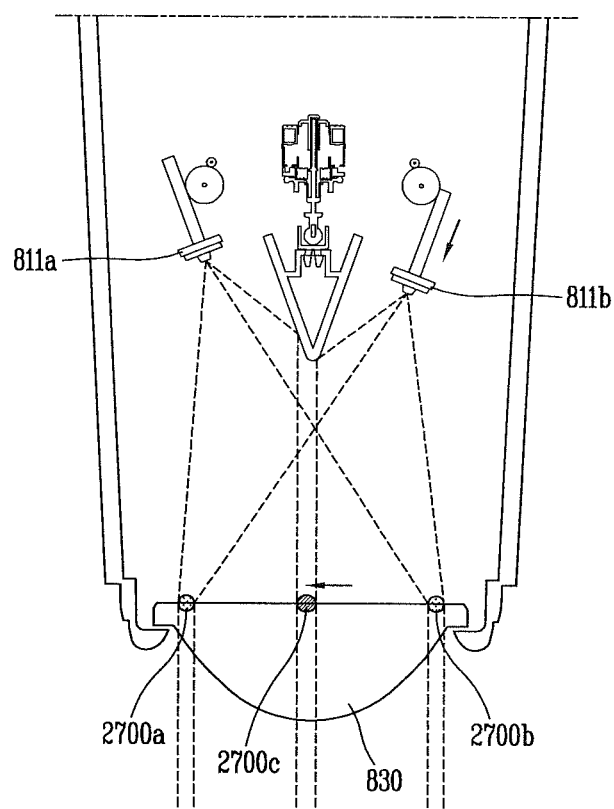

For example, as illustrated in FIG. 27, the center position of the third region 2700c may be moved in response to the linear movement of only part of the at least two light sources 811a and 811b. In this instance, the center position may be moved in an opposite direction to the direction that the light source 811b linearly moved toward the lens is located.

For example, when the left light source 811b of the at least two light sources 811a and 811b is linearly moved toward the lens, the center position of the third region 2700c may be moved to right.

On the other hand, the center position may be understood as being moved in a direction where the light source 811a linearly away from the lens is located.

For example, when the right light source 811b of the at least two light sources 811a and 811b is linearly moved away from the lens, the center position of the third region 2700c may be moved to right.

Also, the center position of the third region 2700c may be moved in a direction that a light source rotated toward the reflector 822 of the at least two light sources 811a and 811b is located.

For example, when the right light source 811a of the at least two light sources 811a and 811b is rotated toward the reflector 822 centering on the one axis T4, the center position of the third region may be moved to right.

To this end, the processor 870 may control the light source unit 810 such that only a part of the at least two light sources can be linearly moved or rotated, in order to change the center position of the third region.

Changing the center positions of the first to third regions may include changing an emitting direction of light that is transmitted through the lens 800 for the vehicle.

Figure 28:
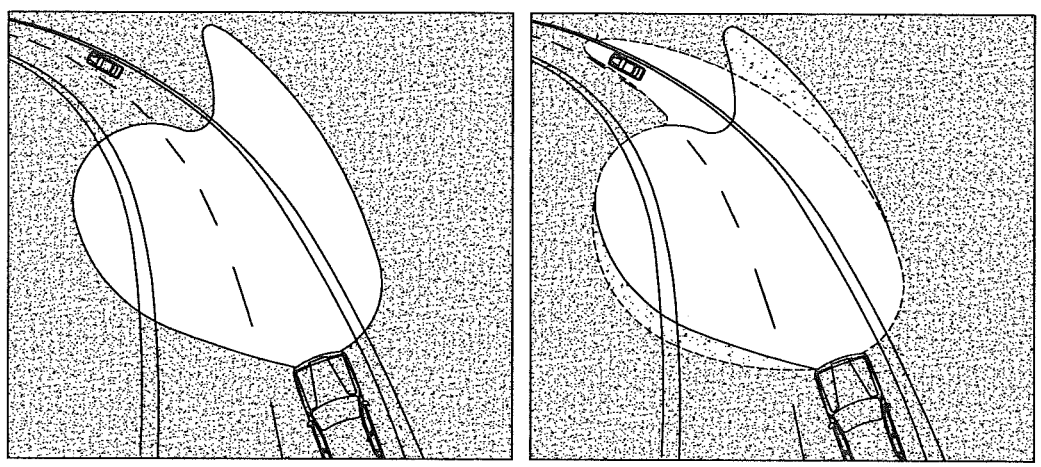
FIG. 28 is a diagram illustrating an example operation of a lamp for a vehicle.

FIG. 28 illustrates an example operation of a lamp for a vehicle.

The lamp for the vehicle may output (emit) light to the front so as to form a predetermined light (beam) pattern. In this instance, when a preset object to which light is to be emitted is sensed by the sensing unit 120 of the vehicle, the processor 870 may control at least one of the light source unit 810 and the reflection unit 820 to output light to the sensed object using the lamp 800 for the vehicle.

In this example, the preset object refers to a preset object to which light is to be additionally (intensively) emitted from the ADAS. For example, the preset object may include an object (e.g., another vehicle, a person, an animal, a traffic sign, a surrounding environment, a notice board, a traffic light, a lane, etc.) that exists within a predetermined distance from the vehicle 100 or an object which is preset such that a driver can pay attention thereto. The preset object may be decided or changed based on the control of the processor or a user setting.

In this instance, the processor 870 may linearly move or rotate the light source and/or the reflector or incline at least one of the plurality of reflective surfaces of the reflector, such that the reflected light reflected by the reflector 822 can be output to the sensed object on the basis of a size and position of the sensed object.

In detail, the processor 870 may control the light source unit 810 and the reflection unit 820 such that the reflected light incident on the third region can be output to the sensed object to correspond to the size and position of the sensed object.

The lamp for a vehicle can emit light to a space corresponding to a sensed object, by linearly moving or rotating at least two light sources, linearly moving or rotating a reflector or inclining at least one of a plurality of reflective surfaces of the reflector.

In addition, the processor 870 of the lamp for the vehicle can control the light source unit 810 and the reflection unit

820 such that light cannot be incident to another vehicle, when the another vehicle currently moving in an opposite direction to a driving direction of the vehicle 100 is sensed.

When the another vehicle currently moving in the opposite direction is sensed, the processor 870 may change center positions or reduce sizes of the first to third regions, such that light incident directly from the at least two light sources and reflected light reflected by the reflector cannot be output toward the sensed another vehicle.

With the configuration, the lamp for the vehicle can implement an antiglare high-beam assist function to prevent light from being emitted to a vehicle moving on an opposite lane.

The vehicle may include the lamp 800 for the vehicle. That is, the lamp 800 for the vehicle may be included in the vehicle 100.

In some implementations, the operations or control methods of the lamp 800 for the vehicle can equally/similarly be applied to operations or control methods of the vehicle 100 (or the controller 170). The functions, the configurations, or the control methods executed by the processor 870 provided in the lamp 800 for the vehicle can be executed by the controller 170 provided in the vehicle 100. That is, every control method described in this specification can also be applied to a control method for a vehicle or a control method for a control device.

The examples described in this specification can be implemented as computer-readable codes in a program-recorded medium. The computer-readable medium may include all types of recording devices each storing data readable by a computer system. Examples of such computer-readable media may include hard disk drive (HDD), solid state disk (SSD), silicon disk drive (SDD), ROM, RAM, CD-ROM, magnetic tape, floppy disk, optical data storage element and the like. Also, the computer-readable medium may also be implemented as a format of carrier wave (e.g., transmission via an Internet). The computer may include the controller 180 of the terminal. Therefore, it should also be understood that the above-described implementations are not limited by any of the details of the foregoing description, unless otherwise specified, but rather should be construed broadly within its scope as defined in the appended claims, and therefore all changes and modifications that fall within the metes and bounds of the claims, or equivalents of such metes and bounds are therefore intended to be embraced by the appended claims.

What is claimed is:

1. A lamp for a vehicle, the lamp comprising:
   a light source unit that is configured to generate light and that includes a first light source and a second light source;
   a reflection unit that is located between the first light source and the second light source and that includes a reflector configured to reflect light that is incident from at least one of the first light source or the second light source;
   a lens including:
     a first region to which light from the first light source is directed,
     a second region to which light from the second light source is directed, and
     a third region (i) that is different from the first region and the second region and (ii) to which light reflected by the reflector is directed; and
   a processor that is configured to control at least one of the first light source or the second light source to change a size or a center position of at least one of the first region, the second region, or the third region.

2. The lamp of claim 1, wherein the reflection unit further includes:
   an actuator that is configured to move the reflector, and
   a pivot coupling portion that couples the actuator to the reflector.

3. The lamp of claim 2, wherein the actuator is configured to:
   move the reflector linearly along a first axis that extends from the actuator to the reflector.

4. The lamp of claim 2, wherein the reflection unit further includes:
   a ball joint that couples the pivot coupling portion to the reflector and that is configured to enable rotation of the reflector.

5. The lamp of claim 2, wherein the reflector includes:
   a plurality of reflective surfaces that are configured to reflect light that is incident from at least one of the first light source or the second light source, and
   wherein the plurality of reflective surfaces are joined at a first portion of the reflector.

6. The lamp of claim 5, wherein each of the plurality of reflective surfaces is configured to rotate independently, and
   wherein a first end of each reflective surface is rotatably fixed to the first portion of the reflector.

7. The lamp of claim 5, wherein the plurality of reflective surfaces include:
   a first reflective surface and a second reflective surface,
   wherein the first reflective surface and the second reflective surface are joined at the first portion of the reflector, and
   wherein each of the first reflective surface and the second reflective surface is configured to rotate about a third axis that is adjacent to the first portion of the reflector.

8. The lamp of claim 5, wherein the plurality of reflective surfaces includes:
   at least three reflective surfaces,
   wherein the at least three reflective surfaces are joined at the first portion of the reflector, and
   wherein each of the at least three reflective surfaces is configured to move and establish a first angle between the reflective surface and the pivot coupling portion.

9. The lamp of claim 5, wherein the pivot coupling portion includes:
   a first coupling portion that is coupled to the actuator,
   a second coupling portion that surrounds at least a portion of an outer surface of the first coupling portion, and
   a third coupling portion that couples the second coupling portion to the plurality of reflective surfaces,
   wherein, based on movement of the actuator, each of the plurality of reflective surfaces is configured to move and establish a first angle between the reflective surface and the pivot coupling portion.

10. The lamp of claim 1, wherein the light source unit includes:
    a linear gear that is coupled to the first light source or the second light source, and
    a first driving portion that is coupled to the linear gear and that is configured to move the linear gear linearly.

11. The lamp of claim 10, wherein the first driving portion includes:
    a rotatable gear that is coupled to the linear gear, and
    a first actuator that is coupled to the rotatable gear and that is configured to rotate the rotatable gear, and
    wherein, based on rotation of the rotatable gear, the linear gear is configured to move linearly.

12. The lamp of claim 1, wherein the light source unit includes:
- a linear gear that is coupled to the first light source or the second light source, and
- a second driving portion that is coupled to the linear gear and that is configured to rotate the linear gear about a fourth axis that is in a plane of the linear gear.

13. The lamp of claim 12, wherein the second driving portion includes:
- a circular plate that is coupled to a portion of the linear gear, and
- a second actuator that is coupled to the circular plate and that is configured to rotate the circular plate,
- wherein, based on rotation of the circular plate, the linear gear is configured to rotate about the fourth axis.

14. The lamp of claim 1, wherein the processor is configured to:
- based on rotation or movement of the first light source or the second light source, change a size or a center position of each of the first region and the second region.

15. The lamp of claim 1, wherein the processor is configured to:
- based on (i) rotation or movement of the reflector, (ii) rotation or movement of the first light source or the second light source, or (iii) an inclination of the reflector,
- change a center position or a size of the third region.

16. The lamp of claim 15, wherein the processor is configured to:
- change a size of the third region based on the reflector moving toward the lens.

17. The lamp of claim 15, wherein the processor is configured to:
- change a size of the third region based on the first light source or the second light source moving toward the lens.

18. The lamp of claim 15, wherein the processor is configured to:
- change a size of the third region based on the first light source or the second light source rotating toward the reflector.

19. The lamp of claim 15, wherein the processor is configured to:
- change a size of the third region based on the reflector being inclined toward the lens.

20. The lamp of claim 15, wherein the processor is configured to:
- move a center position of the third region in a direction to which the reflector rotates.

21. The lamp of claim 15, wherein the processor is configured to:
- move a center position of the third region based on the reflector being inclined toward the lens.

22. The lamp of claim 15, wherein the processor is configured to:
- move a center position of the third region based on the first light source or the second light source moving or rotating.

23. A vehicle comprising a lamp that includes:
- a light source unit that is configured to generate light and that includes a first light source and a second light source;
- a reflection unit that is located between the first light source and the second light source and that includes a reflector configured to reflect light that is incident from at least one of the first light source or the second light source;
- a lens including:
  - a first region to which light from the first light source is directed,
  - a second region to which light from the second light source is directed, and
  - a third region (i) that is different from the first region and the second region and (ii) to which light reflected by the reflector is directed; and
- a processor that is configured to control at least one of the first light source or the second light source to change a size or a center position of at least one of the first region, the second region, or the third region.

* * * * *